US010451951B1

(12) United States Patent
Yap et al.

(10) Patent No.: US 10,451,951 B1
(45) Date of Patent: Oct. 22, 2019

(54) PUSH-PULL PHOTONIC MODULATOR

(71) Applicant: HRL Laboratories, LLC, Malibu, CA (US)

(72) Inventors: Daniel Yap, Newbury Park, CA (US); Ryan G. Quarfoth, Los Angeles, CA (US); Troy D. Rockwood, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/054,108

(22) Filed: Aug. 3, 2018

Related U.S. Application Data

(60) Provisional application No. 62/568,700, filed on Oct. 5, 2017.

(51) Int. Cl.
*G02F 1/035* (2006.01)
*G02F 1/225* (2006.01)
*G02F 1/21* (2006.01)

(52) U.S. Cl.
CPC ...... *G02F 1/2255* (2013.01); *G02F 2001/212* (2013.01); *G02F 2202/20* (2013.01)

(58) Field of Classification Search
CPC .......... G02F 1/025; G02F 1/225; G02F 1/035; G02F 1/011; G02F 2001/212
See application file for complete search history.

(56) References Cited

U.S. PATENT DOCUMENTS

| 7,471,853 B2* | 12/2008 | Sugiyama | ............ G02F 1/0356 359/245 |
| 8,897,614 B2* | 11/2014 | Suzuki | .................... G02F 1/035 385/129 |
| 9,664,931 B1 | 5/2017 | Yap et al. | |
| 9,746,743 B1 | 8/2017 | Rabiei | |

OTHER PUBLICATIONS

"Thin Layer Design of X-Cut LiNbO3 Modulators," IEEE Photonics Technology Letters, v. 12, n. 12, Dec. 2000, p. 1618.
"Improved Electrooptic Modulator with Ridge Structure in X-cut LiNbO3," Journal of Lightwave Technology, v. 17. N. 5, May 1999, p. 843.

(Continued)

*Primary Examiner* — Jennifer Doan
(74) *Attorney, Agent, or Firm* — Ladas & Parry

(57) ABSTRACT

A photonic modulator includes a first electro-optical waveguide, the first electro-optical waveguide having a first electro-optical waveguide side and a second electro-optical waveguide side opposite the first electro-optical waveguide side, a second electro-optical waveguide, the second electro-optical waveguide having a third electro-optical waveguide side and a fourth electro-optical waveguide side opposite the third electro-optical waveguide side, a first driven radio frequency electrode coupled to the first electro-optical waveguide side, a second driven radio frequency electrode coupled to the third electro-optical waveguide side, and a floating electrode coupled to the second electro-optical waveguide side and coupled to the fourth electro-optical waveguide side. The second electro-optical waveguide side and the third electro-optical waveguide side face each other and are spaced apart from one another.

31 Claims, 36 Drawing Sheets

(56) References Cited

OTHER PUBLICATIONS

A. Rao, P. Rabiei and S. Fathpour in "Heterogeneous microring and Mach-Zehnder modulators based on lithium niobate and chalcogenide glasses on silicon," Optics Express, v. 23, No. 17, Aug. 24, 2015. p. 22746.

R.B. Waterhouse and D. Novak in "Integrated antenna/electrooptic modulator for RF photonic front-ends," Proceedings 2011 International Microwave Symposium, Jun. 2011.

S. Sriram and V. Stenger in Technical Digest of the Conference on Lasers and ElectroOptics CLEO2013, paper CW3O.3 (Optical Society of America 2013.

\* cited by examiner

|  | Version 1 | Version 2 |
|---|---|---|
| G | 15 um | 8 um |
| L | 9 um | 21 um |
| E-field | 2.75e6 V/m | 2.63e6 V/m |
| S21 | −3.55 dB/cm | −3.49 dB/cm |

|  | Version 1 | Version 3 |
|---|---|---|
| A | 10 um | 8 um |
| L | 9 um | 13 um |
| E-field | 2.75e6 V/m | 2.75e6 V/m |
| S21 | −3.55 dB/cm | −3.59 dB/cm |

FIG. 9B

|  | Version 1 | Version 2 |
|---|---|---|
| G | 80 um | 80 um |
| T | 3 um | 12 um |
| E-field | 3.47e6 V/m | 3.36e6 V/m |
| S21 | -6.05 dB/cm | -5.50 dB/cm |
| $Z_0$ | 23 Ohms | 25 Ohms |

FIG. 20C

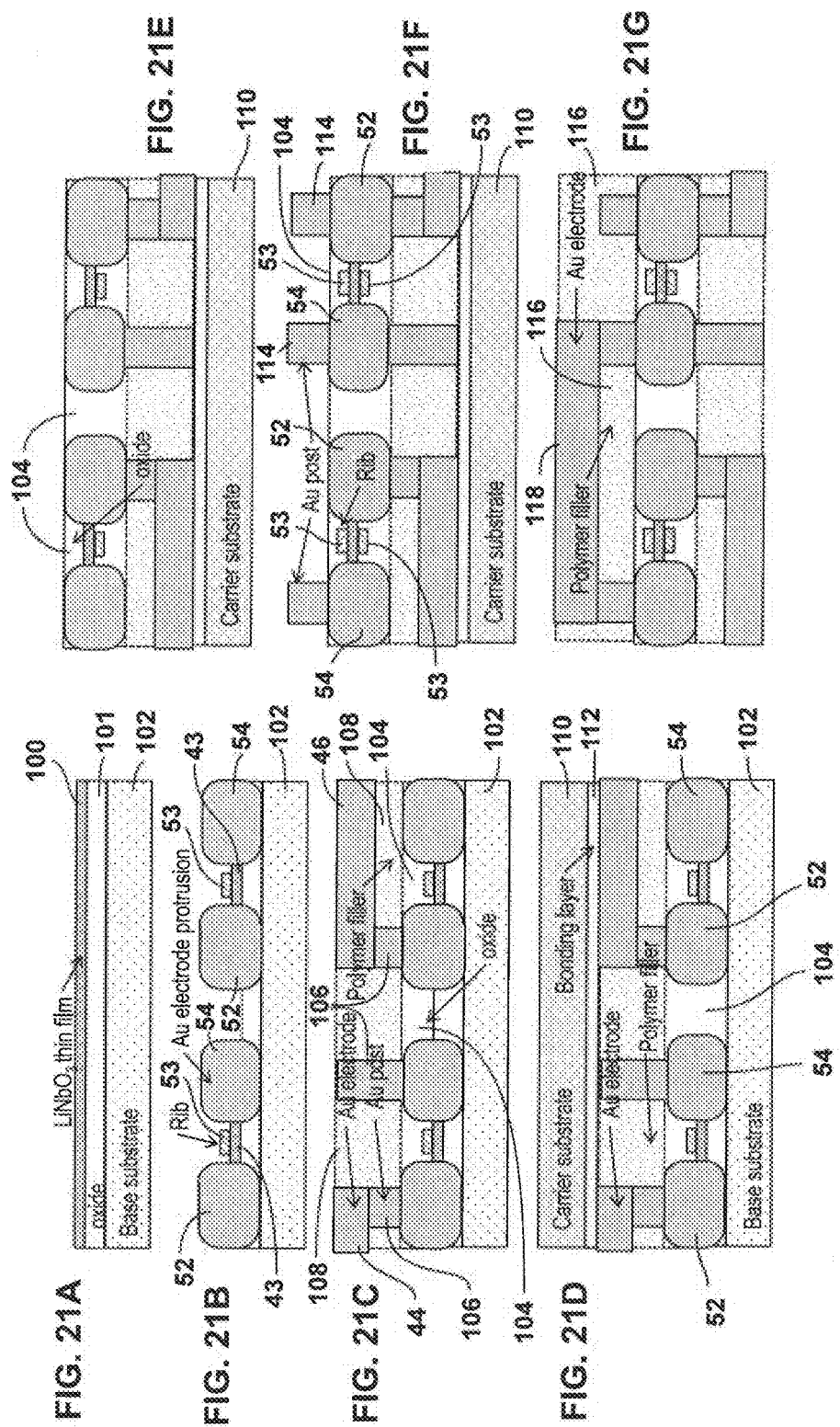

PUSH-PULL PHOTONIC MODULATOR

CROSS REFERENCE TO RELATED APPLICATIONS

This application is related to and claims priority from U.S. Provisional Patent Application Ser. No. 62/568,700, filed Oct. 5, 2017, which is incorporated herein by reference as though set forth in full.

STATEMENT REGARDING FEDERAL FUNDING

None

TECHNICAL FIELD

This disclosure relates to photonic and electro-optic modulators.

BACKGROUND

A prior art modulator, shown in FIG. 1, is described in U.S. Pat. No. 9,664,931, issued May 30, 2017. Another prior modulator, also described in in U.S. Pat. No. 9,664,931, issued May 30, 2017 is shown in FIG. 2. This prior modulator has two drive electrodes and a third electrode that is floating. This prior modulator uses lithium niobate for its electro-optical (EO) material and the lithium niobate material of this prior modulator is a Z-cut material and thus the electrodes need to be located above and below the EO waveguides, rather than at the lateral sides of the EO waveguides.

A prior modulator that makes use of a X-cut lithium niobate material is described by I. L. Gheorma, P. Savi and R. M. Osgood, Jr. in "Thin Layer Design of X-Cut LiNbO3 Modulators," IEEE Photonics Technology Letters, v. 12, n. 12, December 2000, p. 1618. For this prior modulator, shown in FIG. 3, the metal electrodes are located at the sides of ridges formed of the lithium niobate material containing the two EO waveguides. However, a portion of the lithium niobate material extends laterally beyond those ridges and underneath the metal electrodes. Thus, since the dielectric constant of lithium niobate is very high, a significant portion of the electric field is present in the extended portions of lithium niobate material rather than overlapping with the light propagating in the two waveguides. A similar structure is described by S. J. Chang, et al. in "Improved Electrooptic Modulator with Ridge Structure in X-cut LiNbO3," Journal of Lightwave Technology, v. 17. N. 5, May 1999, p. 843.

Yet another prior modulator described by A. Rao, P. Rabiei and S. Fathpour in "Heterogeneous microring and Mach-Zehnder modulators based on lithium niobate and chalcogenide glasses on silicon," Optics Express, v. 23, no. 17, 24 Aug. 2015, p. 22746, makes use of a thin film of Y-cut lithium niobate material with the light propagating along the material X axis. This structure places the metal electrodes above the lithium niobate film, as illustrated in FIG. 4. Again, a substantial portion of the modulating electric field is dropped across the portions of the lithium niobate layer where the light is not present. Thus, the modulation efficiency of this prior structure is poorer. The best value for $V\pi$ (the RF drive voltage needed to achieve full on/off modulation of the output light) achieved with this prior structure is 3.8 volts at a low modulation frequency.

Another prior modulator structure, illustrated in FIG. 5, likewise places the electrodes at the top surface of a thin but laterally continuous layer of lithium niobate. This prior modulator is described by S. Sriram and V. Stenger in Technical Digest of the Conference on Lasers and ElectroOptics CLEO2013, paper CW30.3 (Optical Society of America 2013. A value of 2.5 volts was obtained for $V\pi$ at DC.

Direct integration of an electro-optic modulator with an antenna is described by R. B. Waterhouse and D. Novak in "Integrated antenna/electrooptic modulator for RF photonic front-ends," Proceedings 2011 International Microwave Symposium, June 2011, IEEE, and uses a conventional Z-cut lithium niobate modulator integrated with a printed patch antenna.

Only the modulators described in U.S. Pat. No. 9,664,931, issued May 30, 2017 have two strips of lithium niobate EO material that are optically and physically separate from each other except at the longitudinal ends of those strips. For all the other prior modulators based on lithium niobate material, additional lithium niobate material located underneath or at the sides of the two EO strips connect those strips together, as shown in FIGS. 3-5. Thus, all of the prior art modulators except the modulators described in U.S. Pat. No. 9,664,931 have both EO waveguides sharing a common piece of EO material that is laterally contiguous, meaning the two EO waveguides are contiguous in the cross section made through the pair of phase-modulation arms of the modulator. According to the publications of Gheorma and of Chang, referenced above, the metal electrodes placed against the shorter sides (or edges) of the optical waveguide abut only a portion of those edges. According to the later devices of Sriram and Stenger, referenced above, the metal electrodes are placed above the lithium niobate layer. According to the even later devices of Rao, Rabiei and Fathpour, referenced above, the metal electrodes are placed above the lithium niobate layer and a dielectric strip also is placed above the lithium niobate layer, on the same side of the lithium niobate layer as the metal electrodes.

None of the prior art modulators that have thin layers of lithium niobate are designed to operate in a push-pull manner with a balanced two-conductor RF feed.

Another electro-optic optical modulator is described by Rabiei in U.S. Pat. No. 9,746,743, issued Aug. 29, 2017, which is incorporated herein by reference.

What is needed is an improved electro-optic modulator that operates in a balanced push-pull manner. The embodiments of the present disclosure answer these and other needs.

SUMMARY

In a first embodiment disclosed herein, a photonic modulator comprises a first electro-optical waveguide, the first electro-optical waveguide having a first electro-optical waveguide side and a second electro-optical waveguide side opposite the first electro-optical waveguide side, a second electro-optical waveguide, the second electro-optical waveguide having a third electro-optical waveguide side and a fourth electro-optical waveguide side opposite the third electro-optical waveguide side, a first driven radio frequency electrode coupled to the first electro-optical waveguide side, a second driven radio frequency electrode coupled to the third electro-optical waveguide side, and a floating electrode coupled to the second electro-optical waveguide side and coupled to the fourth electro-optical waveguide side, wherein the second electro-optical waveguide side and the third electro-optical waveguide side face each other and are spaced apart from one another.

In another embodiment disclosed herein, a photonic modulator, a first electro-optical waveguide, the first electro-optical waveguide having a first electro-optical waveguide side and a second electro-optical waveguide side opposite the first electro-optical waveguide side, a second electro-optical waveguide, the second electro-optical waveguide having a third electro-optical waveguide side and a fourth electro-optical waveguide side opposite the third electro-optical waveguide side, a first driven radio frequency electrode coupled to the first electro-optical waveguide side and to the fourth electro-optical waveguide side, a second driven radio frequency electrode coupled to the second electro-optical waveguide side and coupled to the third electro-optical waveguide side, wherein the second electro-optical waveguide side and the third electro-optical waveguide side face each other and are spaced apart from one another.

In yet another embodiment disclosed herein, a method of providing a photonic modulator comprises providing a base substrate having an oxide layer on the base substrate and an electro-optic material on the oxide layer, forming a first silicon nitride rib on the electro-optic material, etching the electro-optic material to form an electro-optic strip, etching the oxide layer at opposite ends of the electro-optic strip, forming electrode protrusions at the opposite ends of the electro-optic strip, covering the electro-optic strip with oxide, forming first electrode posts on the electrode protrusions, filling regions between the first electrode posts with a dielectric filler, forming first radio frequency electrodes coupled to the first electrode posts, depositing dielectric filler, planarizing a top surface to be planar with the first radio frequency electrodes, bonding the top surface to a carrier substrate, removing the base substrate, forming second electrode posts on the electrode protrusions, filling spaces between the second electrode posts with dielectric filler, forming second radio frequency electrodes coupled to the second electrode posts, and filling spaces between the second radio frequency electrodes with polymer.

In still another embodiment disclosed herein, a method of providing a photonic modulator comprises providing a first electro-optical waveguide, the first electro-optical waveguide having a first electro-optical waveguide side and a second electro-optical waveguide side opposite the first electro-optical waveguide side, providing a second electro-optical waveguide, the second electro-optical waveguide having a third electro-optical waveguide side and a fourth electro-optical waveguide side opposite the third electro-optical waveguide side, providing a first driven radio frequency electrode coupled to the first electro-optical waveguide side, providing a second driven radio frequency electrode coupled to the third electro-optical waveguide side, and providing a floating electrode coupled to the second electro-optical waveguide side and coupled to the fourth electro-optical waveguide side, wherein the second electro-optical waveguide side and the third electro-optical waveguide side face each other and are spaced apart from one another.

In yet still another embodiment disclosed herein, a method of providing a photonic modulator comprises providing a first electro-optical waveguide, the first electro-optical waveguide having a first electro-optical waveguide side and a second electro-optical waveguide side opposite the first electro-optical waveguide side, providing a second electro-optical waveguide, the second electro-optical waveguide having a third electro-optical waveguide side and a fourth electro-optical waveguide side opposite the third electro-optical waveguide side, providing a first driven radio frequency electrode coupled to the first electro-optical wave- guide side and to the fourth electro-optical waveguide side, providing a second driven radio frequency electrode coupled to the second electro-optical waveguide side and coupled to the third electro-optical waveguide side, wherein the second electro-optical waveguide side and the third electro-optical waveguide side face each other and are spaced apart from one another, and wherein the first driven radio frequency electrode has a U shaped cross-section and the second driven radio frequency electrode has an inverted U shaped cross-section.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 9A, 9B and 9C show examples of RF E-field distribution in modulator electrode structure: FIG. 9A E-field vectors, FIG. 9B parameters, and FIG. 9C relative E-field intensity in accordance with the present disclosure;

FIG. 13B showing the structure, FIG. 13A showing RF E-field intensity distribution, and FIGS. 13C and 13D showing dependence of E-field in EO waveguides and RF loss on the electrode structure parameters G, in accordance with the present disclosure;

FIG. 15A optical figure of merit, FIG. 15B overlap of optical field with the $LiNbO_3$ EO strip, and FIG. 15C loss of the wave-guided optical mode in accordance with the present disclosure;

FIGS. 20A, 20B and 20C show a modulator with three driven electrodes, including a driven electrode located between the two EO waveguides and examples of simulation results in accordance with the present disclosure; and FIGS. 21A, 21B, 21C, 21D, 21E, 21F and 21G show a process for fabricating a push-pull electro-optic modulator in accordance with the present disclosure.

DETAILED DESCRIPTION

Figure 1:
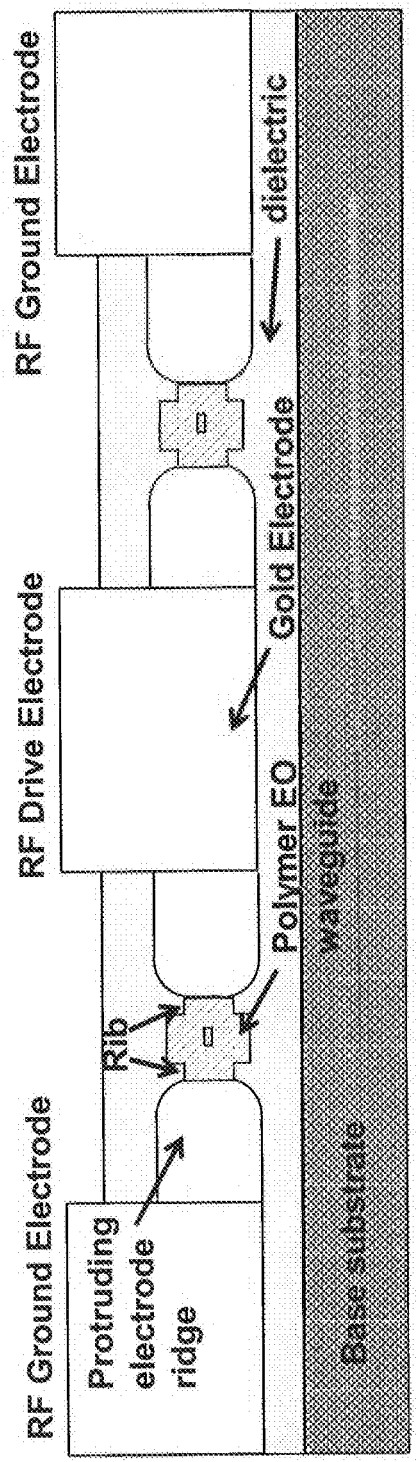
FIG. 1 shows a modulator that has the driven electrodes located at the sides of the two strips of EO material in accordance with the prior art.
Figure 2:
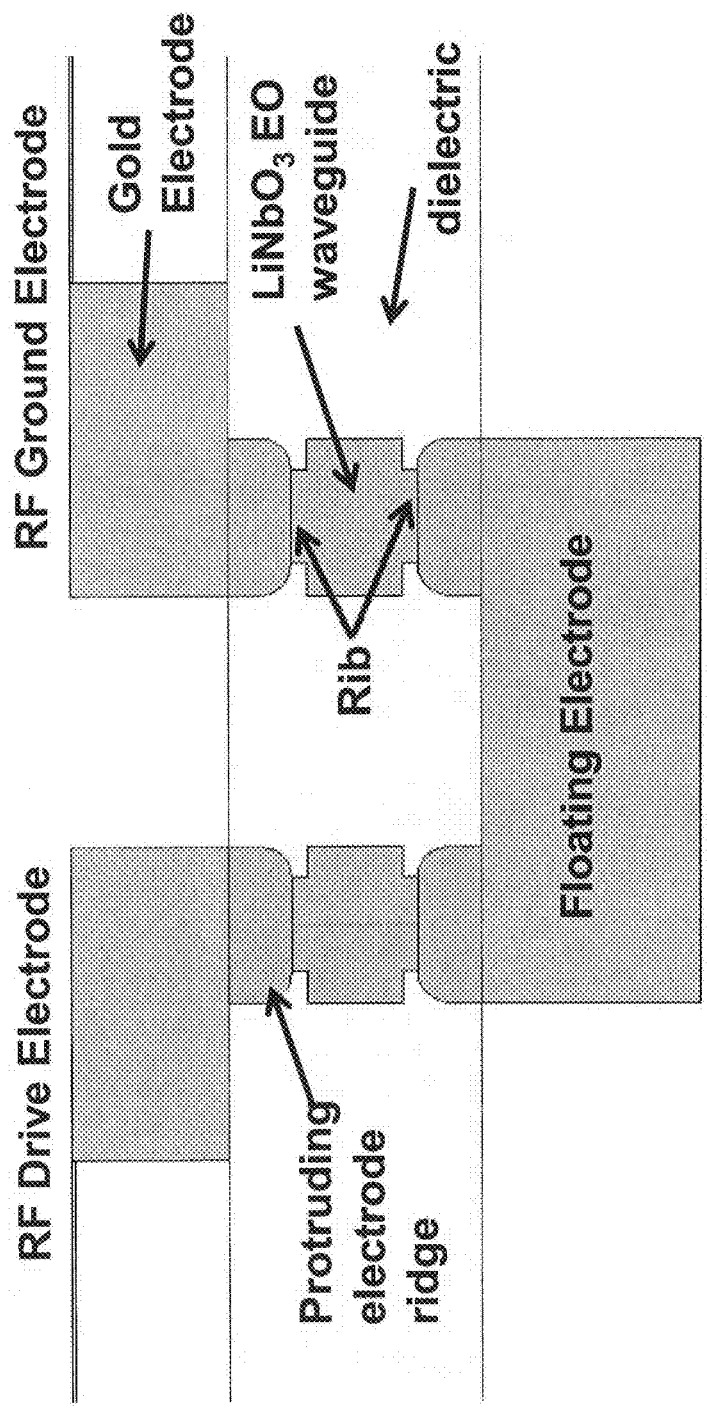
FIG. 2 shows a modulator that is based on Z-cut lithium niobate and that has a floating electrode coupled to the two EO waveguides of Z-cut lithium niobate in accordance with the prior art.
Figure 3:
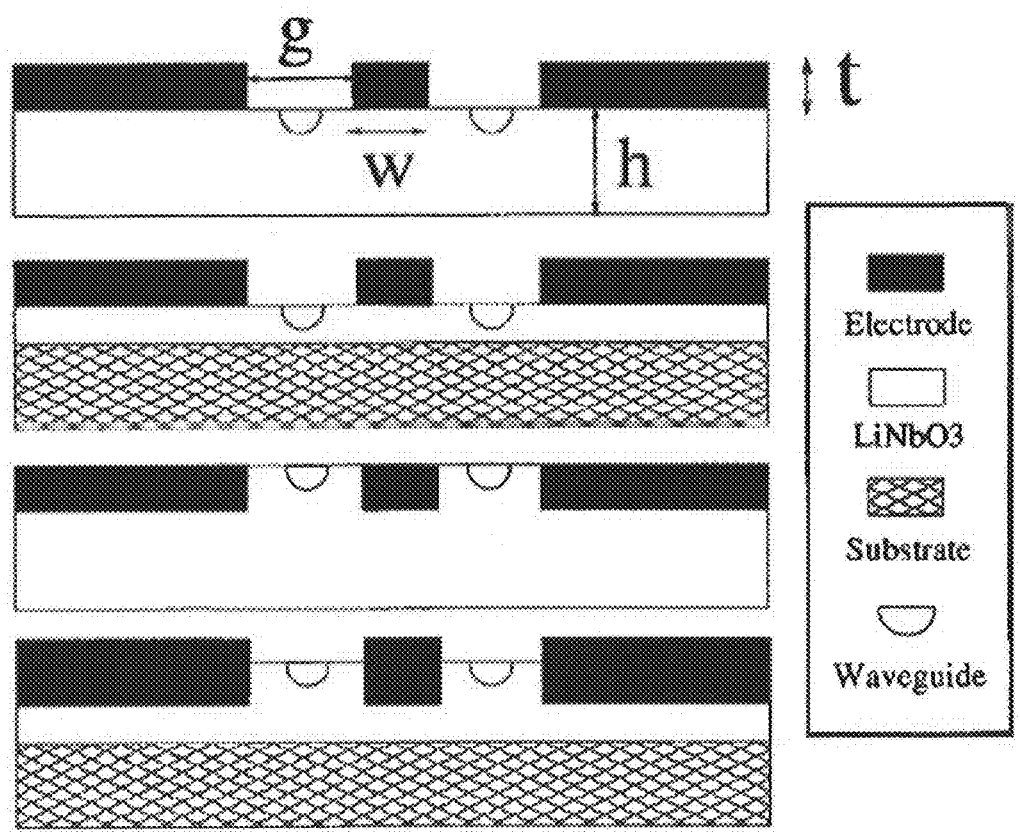
FIG. 3 shows a modulator that is based on x-cut lithium niobate and that has the metal electrodes located at the sides of ridges formed of the lithium niobate material in accordance with the prior art.
Figure 4A:
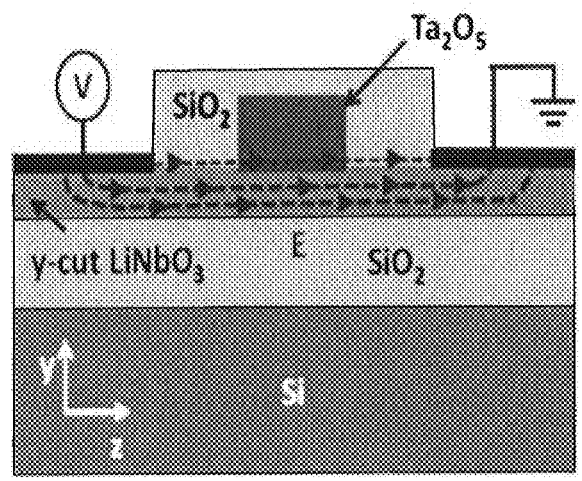
FIGS. 4A, 4B and 4C show a modulator structure with a thin layer of Y-cut lithium niobate and a high-index strip above that lithium niobate layer, and metal electrodes are placed above the thin layer of lithium niobate in accordance with the prior art.
Figure 4B:
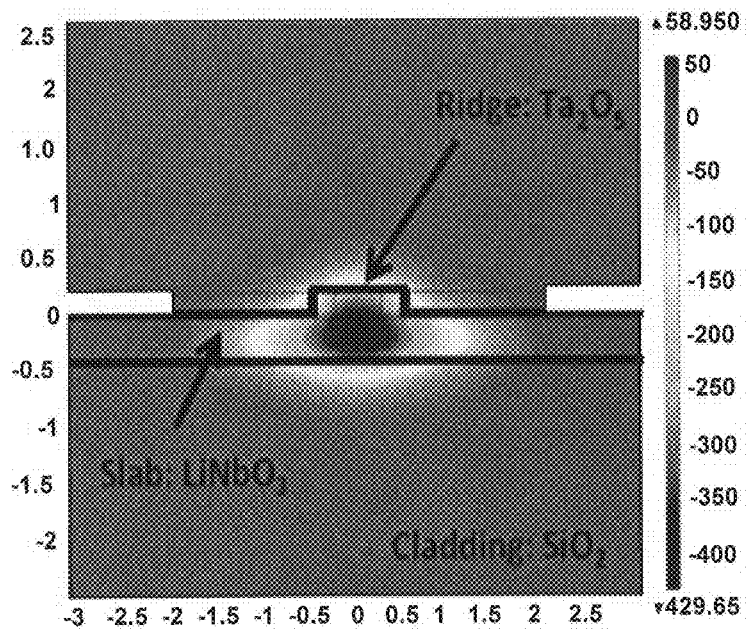
Figure 4C:
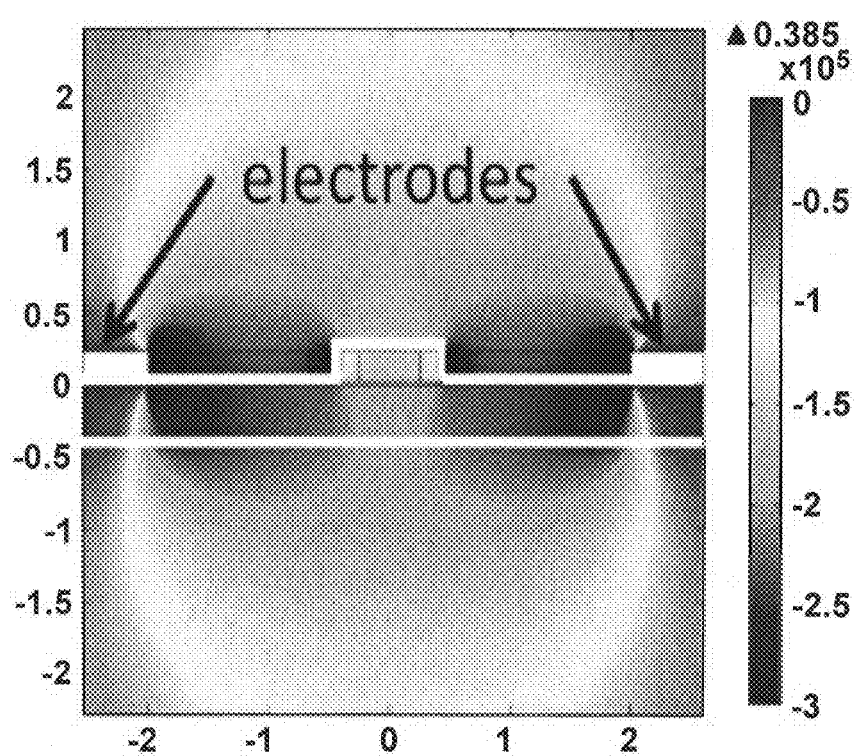
Figure 5:
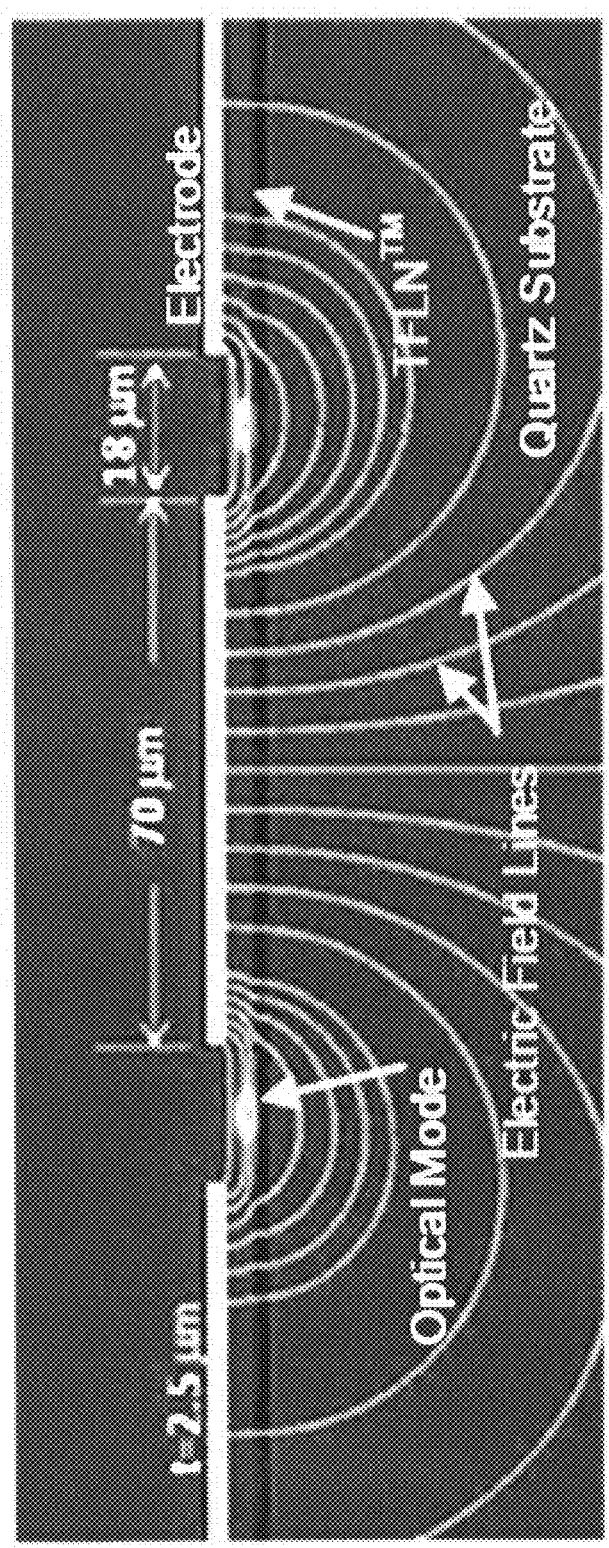
FIG. 5 shows a modulator structure with 3 driven electrodes placed above a thin layer of lithium niobate in accordance with the prior art.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a Mach-Zehnder interferometric modulator that has a pair of co-planar, electro-optic (EO) waveguides coupled to optical input and output waveguides. The two EO waveguides are the phase-modulation paths of the Mach-Zehnder interferometer. The modulator has an electrode structure that applies an electric field of one polarity across the first EO waveguide and an electric field of the opposite polarity across the second EO waveguide. Thus, the two phase-modulation paths are driven in a push-pull manner in order to enhance the intensity-modulation efficiency of the Mach-Zehnder modulator. An important feature of the modulator of the present disclosure is that the push-pull drive is accomplished by using only a pair of RF-driven electrodes coupled to the two EO waveguides. In some embodiments, there may be a third electrode that is coupled to both EO waveguides. However, the third electrode is floating, without being connected directly to either of the pair of RF drive circuits.

The electrode structure is an RF transmission line through which the RF modulation signal travels and generates travelling and time-varying electric-field distributions across the EO waveguides. The RF signal that controls the modulator is coupled into one longitudinal end of the electrode structure and onto a pair of primary current carrying electrodes. A broadband electrical load is typically connected to the other longitudinal end of the electrode structure. Except at their two longitudinal ends (distinct from the lateral ends of the longer sides of the rectangular-shaped cross-section, described below), at which the two EO waveguides are coupled to the input and output optical waveguides which they share, these two EO waveguides are physically distinct, separate from each other, and optically de-coupled from each other. The RF field travelling through the RF transmission line travels in the same direction as the optical fields travelling through the two EO waveguides. Each of the EO waveguides has a nominally rectangular cross-section; the cross-section thus has two short sides or edges and 2 long sides. Each EO waveguide is abutted at its two short edges by metal protrusions of the electrode structure. In some embodiments, the metal is separated from the two short edges of the EO waveguide by small gaps filled with a spacer material having a low optical refractive index and a moderately high dielectric constant.

In another embodiment, an antenna has the presently disclosed Mach-Zehnder modulator located at its feed point. The two driven electrodes of the modulator are electrically coupled to the two primary metal portions of the antenna. A balanced antenna such as a center-fed dipole antenna or loop antenna could have the two driven electrodes of the modulator coupled to the two ends of the loop or the dipole center. The modulator, with two driven electrodes, is especially suited for direct coupling to antennas that desire a balanced feed. However, some variations of the modulator, such as variants of the HS modulator disclosed herein, could be optimized for specific unbalanced feeds.

In a first embodiment (the so-called HS structure), one primary current-carrying driven electrode is electrically coupled to a metal protrusion that abuts the outer edge of one of the EO waveguides. A second primary current-carrying driven electrode is electrically coupled to a metal protrusion that abuts the inner edge of the second EO waveguide (the inner edges of the waveguides being the ones that lie between the waveguides). In this embodiment, a secondary floating electrode is electrically coupled to both a metal protrusions that abuts the inner edge of the first EO waveguide and a metal protrusion that abuts the outer edge of the second EO waveguide.

In a second embodiment (the so-called double-U structure), one primary current-carrying driven electrode is electrically coupled to both a metal protrusion that abuts the inner edge of one of the EO waveguides and to a metal protrusion that abuts the inner edge of the second EO waveguide. A second primary current-carrying driven electrode is electrically coupled to both a metal protrusion that abuts the outer edge of the first EO waveguide and to a metal protrusion that abuts the outer edge of the second EO waveguide. This embodiment does not include a floating electrode.

The metal protrusions can have a rounded shape that is designed to avoid the presence of localized regions of excessively high electric field adjacent to the metal. The electrode structure and its combination of metal protrusions are designed to concentrate the electric field onto the two EO strips.

Each EO waveguide also is abutted near the center of one or both of its long sides (that is, the long sides of the rectangular cross-section) by a strip of an electrically insulating dielectric material having low RF dielectric constant and whose optical refractive index is close to the optical refractive index of the EO waveguide. The optical refractive index of this non-electro-optic material is higher than the optical refractive index of the electrically insulating material surrounding the EO waveguide. The strip of non-electro-optic material serves to keep the light propagating in and guided by the EO waveguide located near the center of the strip and away from the metal protrusions at the edges of the strip.

In some embodiments, each EO waveguide has a strip of non-electro-optic material located on a first face long side of the EO waveguide. On a second face on the long side of the EO waveguide that is opposite from the first face, the EO waveguide is abutted on a portion of that second face and near its two edges by metal extensions of the electrode protrusions. The two metal extensions abutting the second face of the EO waveguide have a second separation. The second separation between metal extensions is larger than the width of the strip of non-electro-optic material. In some embodiments, the EO waveguide also is abutted on a portion of its first face and near its two edges by other metal extensions of the electrode protrusions. The two metal extensions abutting the first face of the EO waveguide have a first separation. The first separation between metal extensions is larger than the second separation between metal extensions.

The EO waveguide strip includes a dielectric electro-optic material. Examples of dielectric EO material include lithium niobate and strontium barium niobate. An example of the non-electro-optic material abutting the EO strip is silicon nitride whose optical refractive index can be made equal to that of lithium niobate, or somewhat higher or somewhat lower than that of lithium niobate. Examples of the low-refractive-index, low-k electrically insulating material are $SiO_2$, Parylene, Teflon, benzo-cyclobutene (BCB) and air. Examples of the high-k spacer material are $SiO_2$, $Al_2O_3$, $Y_2O_3$, and $Nd_2O_5$. Examples of the metal material are gold, silver and copper.

The disclosed EO modulator can achieve on/off modulation of its output light at much lower RF drive power than previous modulators. The RF drive power can be sufficiently low to permit the EO modulator to be coupled directly to an antenna, without needing an electronic preamplifier between the antenna and the EO modulator to increase the RF drive signal. The combination of antenna, EO modulator, laser, photodetector and optical waveguides or optical fiber pieces between the laser and the EO modulator and between the EO modulator and the photodetector can serve the same function as the combination of antenna, RF cable and RF detector. Both combinations can provide an RF output that is indicative of the RF electromagnetic energy collected by the antenna. For the latter combination, the antenna is electrically connected to the electronic circuit, while, for the former combination, which includes the EO modulator and optical waveguides, the antenna is electrically isolated from the electronic circuit to which the RF output is supplied. This electrical isolation can be advantageous in many situations such as when excessive electrical energy coupled through the antenna from its RF output to electronic circuits could damage those circuits.

The embodiments of the EO modulator allow these EO modulators to be compatible with a large variety of antenna types. The disclosed EO modulator is especially suited for antennas that have a balanced feed, unlike antennas fed by coaxial RF cables that would require a wideband balun to interface the coaxial cable with the antenna. The primary electrodes of the modulator can be bonded or soldered or otherwise electrically coupled to an antenna structure.

The disclosed EO modulator can achieve push-pull modulation without needing to have the electro-optic material of the two EO waveguides have opposite poling. For the disclosed modulator, the push-pull modulation is achieved by having the RF input signal supplied to a single set of two primary electrodes, with the push-pull function accomplished by the electrode design. In contrast, for prior art modulators, push-pull modulation is often accomplished by splitting the RF input signal into two paths and then inverting the RF signal in one of those paths. The two RF signals (the inverted signal and the non-inverted signal) are then supplied separately to the two EO waveguides of those prior modulators. Compared to these prior art modulators, the inherent push-pull modulation enables the RF drive power of the disclosed modulator to be half as large, which means the disclosed modulator is twice as efficient as prior art modulators. Other prior art modulators do not have push-pull modulation and only one of their EO waveguides is modulated by the RF input signal. Compared to these other prior art modulators, the required modulation voltage of the disclosed modulator could be half as large and the modulation power can be one-fourth as large.

The disclosed EO modulator is designed to distribute the RF signal evenly between the two EO waveguides while maximizing the RF electric field that is presented across each of the two EO waveguides and also minimizing the overlap of the wave-guided optical field with the metal protrusions of the modulator's electrode structure, which would absorb the light. The shape and dimensions of the electrode protrusions and also of the other portions of the electrode structure are designed to accomplish the maximizing of the RF electric field at the EO waveguides while also minimizing the RF conduction or transmission-line loss of the electrode structure.

Design simulations suggest the disclosed EO modulator can have a value for $P\pi$, the RF drive power needed to achieve full on/off modulation of the output light, that is less than 4 to 9 times smaller than the $P\pi$ of the prior art EO modulators. For a given RF signal frequency, the value for $V\pi$, the RF drive voltage needed to achieve full on/off modulation of the output light, is less than 2 to 3 times smaller than the $V\pi$ of the prior art EO modulators. The modulation bandwidth of the disclosed modulator can range from 30 GHz to 60 GHz, or even higher.

In the structure of the present disclosure, the two EO waveguides at the phase-modulation arms of the Mach-Zehnder interferometer are separated by a metal electrode structure. Placing the metal electrodes against the entire lateral edges of a thin strip of EO material can increase the RF electric field produced by those electrodes across the EO strip. Increasing the RF electric field produced for a given applied RF drive voltage results in more efficient EO modulation, which is a long-standing objective for EO modulators. Methods are disclosed to fabricate strips of optical waveguides comprising EO material that can be buried on all 4 sides by other dielectric material and also to fabricate thick metal structures adjacent to those strips of optical waveguides.

For some embodiments, portions of the metal electrodes abut a long side (long side of the rectangular cross-section of the waveguide, as viewed along the longitudinal direction) of the strip of lithium niobate EO waveguide and a dielectric rib (a strip of non-electro-optic material) abuts an opposite long side of the EO waveguide strip. This feature of the present modulator design can further improve the overlap of the modulating RF electric field with the light to be modulated while also reducing the overlap of the light in the waveguide with the metal electrode. For the prior art modulators that have a strip of non-electro-optic material also placed above the lithium niobate EO layer, such as the devices of Rao, Rabiei and Fathpour above, the metal electrodes are placed on the same side of the lithium niobate layer as the strip of non-electro-optic material. The prior art does not make it obvious to place the metal electrodes at a side of the lithium niobate piece that is opposite the side of the lithium niobate piece in contact with the non-electro-optic strip, meaning below the lithium niobate layer.

None of the prior art modulators that have thin layers of lithium niobate are designed to operate in a push-pull manner with a balanced two-conductor RF feed. Although the desire to integrate the EO modulator directly with an RF antenna is illustrated by the prior art work of Waterhouse and Novak, above, and although balanced antennas and antenna feeds are common, only the modulator of the present disclosure addresses this desire. For a balanced RF feed in which the driven electrodes are located at the lateral sides of the pair of EO waveguide strips, push-pull modulation is achieved in the present disclosure by an electrode structure that is not symmetric. The portion of the electrode structure near the first strip of EO material is quite different from the portion of the electrode structure near the second strip of EO material. For example, one portion of the electrode structure may resemble the letter S and the other portion of the electrode structure may resemble the letter H.

Figure 6:
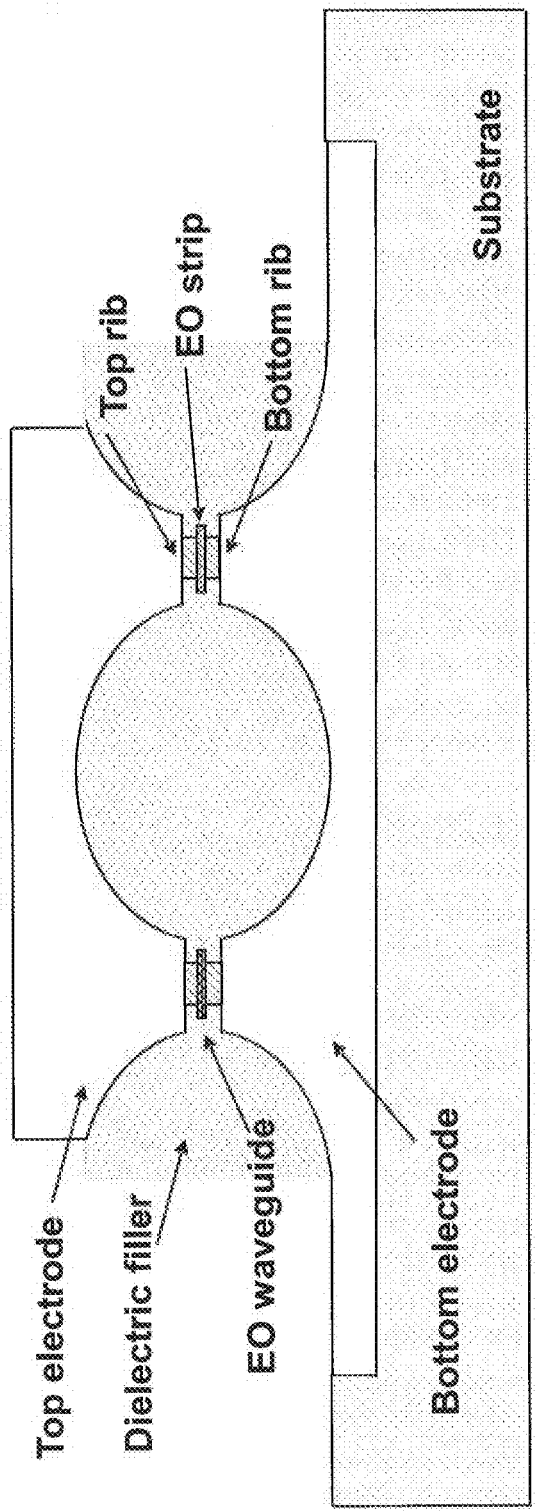
FIG. 6 shows a modulator structure that has a pair of driven metal electrodes placed above and below EO waveguides comprising thin strips of lithium niobate in accordance with the prior art.

A presently disclosed embodiment places the two driven RF electrodes above and below the pair of EO waveguide strips rather than at the lateral sides or edges of those EO waveguide strips. A prior art modulator, which is described in U.S. Pat. No. 9,664,931, likewise has a pair of driven electrodes located above and below the EO waveguides, but the electrodes in that prior art modulator do not abut the lateral short side edges of those EO strips, as shown in FIG. 6.

Figure 7:
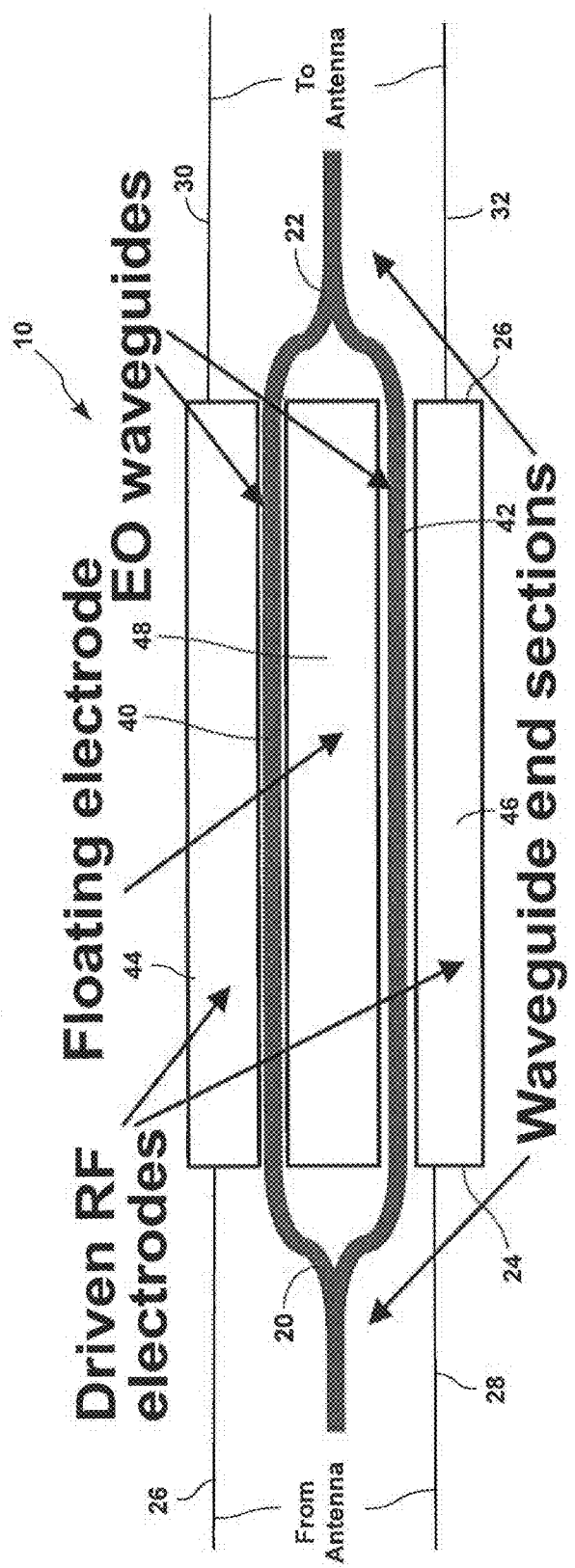
FIG. 7 shows a Mach-Zehnder electro-optic waveguide modulator with a pair of driven RF electrodes and a floating electrode in accordance with the present disclosure.

FIG. 7 illustrates a Mach-Zehnder electro-optic (EO) modulator 10 of the present disclosure that comprises a pair of EO waveguides 40, 42, which are the two optical-phase modulated arms of a Mach-Zehnder interferometer, and an RF electrode structure that includes a pair of driven RF electrodes 44, 46 and, in this embodiment, also a floating electrode 48, to which no RF drive is externally supplied or directly connected. The pair of EO waveguides 40 and 42 are joined together only at their two longitudinal ends 20, 22. Light to be modulated is coupled into the EO waveguides 40 and 42 and, for example, enters the end section 20 of the EO modulator 10. Modulated light then exits from the end section 22 of the EO modulator 10. The two driven electrodes 44 and 46 may be electrically coupled to an RF antenna, such as to the two ends of a loop antenna or to the two feed points of a dipole antenna. An RF signal, such as from the antenna, would preferably travel through the driven electrodes 44 and 46, which serve as an RF transmission line, from lines 26, 28 to lines 30, 32 in the same direction as the optical field travels through the EO waveguides 40 and 42 from 20 to 22, or from left to right in FIG. 7. The two driven electrodes 44 and 46 may be electrically coupled to an RF antenna. As shown in FIG. 7, lines 26 and 28 can be connected to an antenna. Lines 30 and 32, at the opposite end of the driven electrodes, are not directly connected to the antenna, but instead may be connected to an electrical load, such as a resistor. Thus, line 26 might be connected to one end of a loop antenna and line 28 would be connected to the other end of a loop antenna. Or, these two lines 26 and 28 could be connected to the two feed points of a dipole antenna.

Figure 8A:
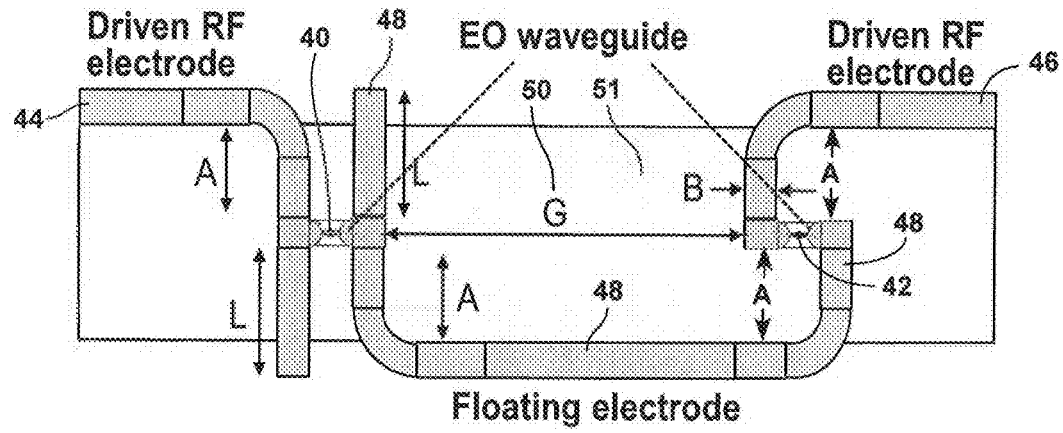
FIGS. 8A and 8B show cross-sectional illustrations of electro-optic modulator structure, FIG. 8A showing the two EO waveguides and the RF electrodes, and FIG. 8B showing detail of one EO waveguide and the RF electrode protrusions adjacent to the EO waveguide, in accordance with the present disclosure.
Figure 8B:
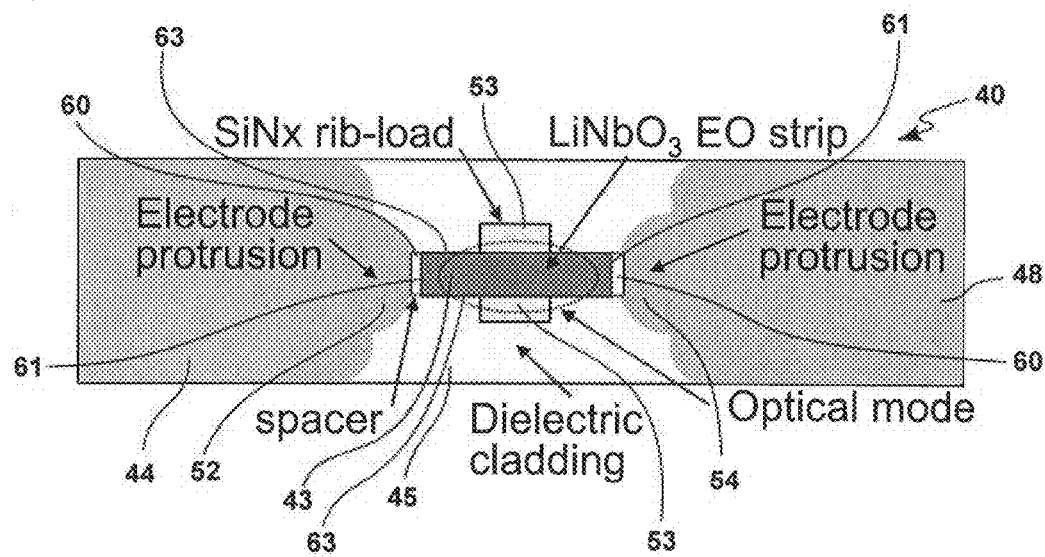

FIGS. 8A and 8B illustrate an example of the cross-section observed at a portion of the modulator of FIG. 7 where the two EO waveguides 40, 42 are separate. FIG. 8B is an expanded view of the region around EO waveguide 40, as depicted in FIG. 8A. Each EO waveguide comprises a thin strip of an electro-optic material such as lithium niobate 43, shown in FIG. 8B. The EO waveguide is embedded in a dielectric cladding material 45 such as $SiO_2$ or Teflon or a polymer whose optical refractive index is lower than the optical refractive index of the lithium niobate and also whose RF dielectric constant is much smaller than the RF dielectric constant of lithium niobate. The electrode structure has two driven RF electrodes 44, 46 and also an un-driven floating electrode 48. The overall shapes of the electrode portions 44, 46, and 48 around EO waveguides 40 and 42 somewhat resemble the letters H and S, respectively. The driven electrode 44, part of the H, in FIG. 8A is coupled to the EO waveguide 40. The driven electrode 46, shown in FIG. 8A is coupled to the EO waveguide 42. The driven electrode 44 abuts a left edge of the lithium niobate strip in EO waveguide 40, and the driven electrode 46 abuts the left edge of EO waveguide 42. The floating electrode 48, abuts the right edge of each of the lithium niobate strips of the EO waveguides 40 and 42.

Figure 9A:
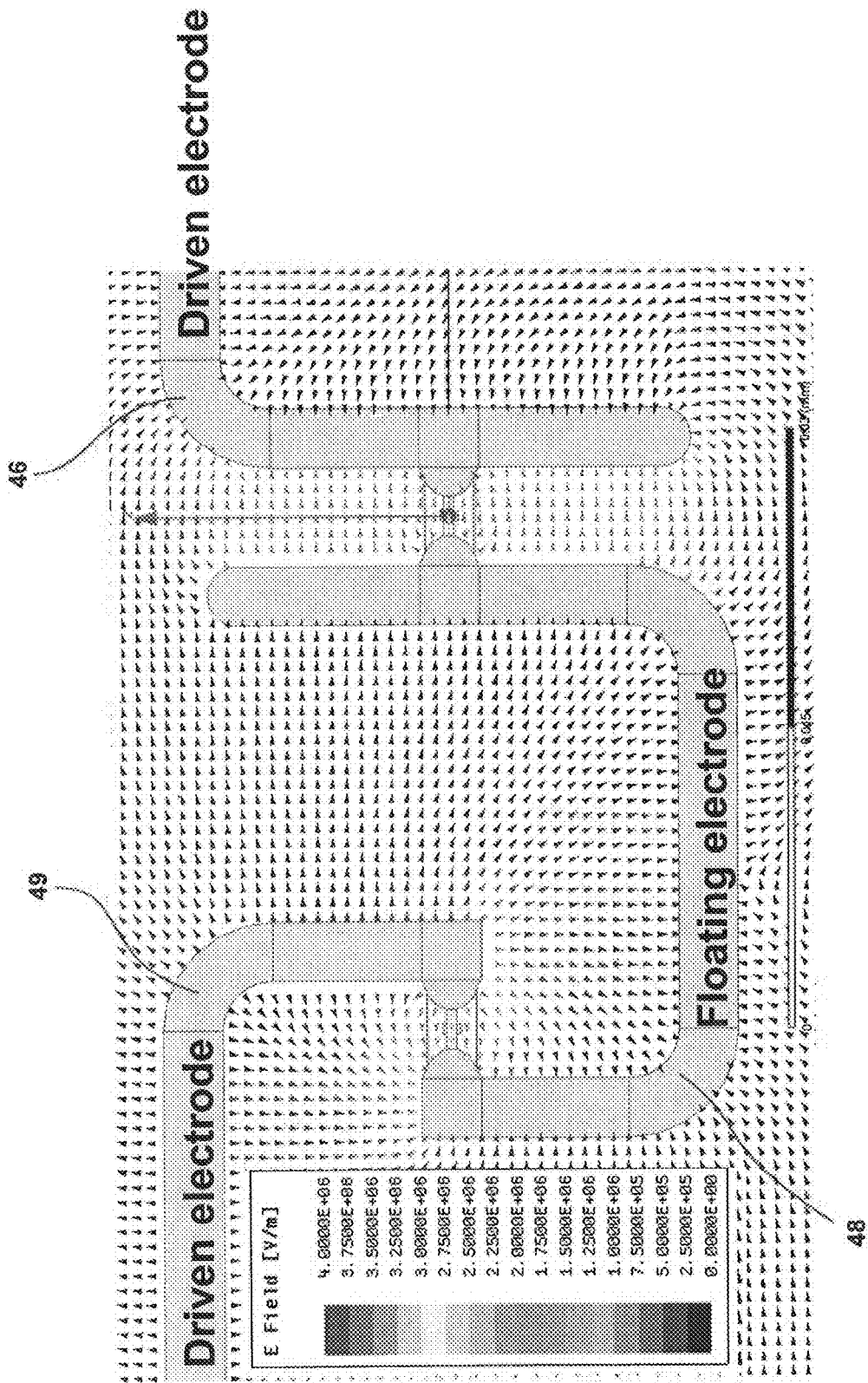

This configuration of the electrodes and EO waveguides produces RF electric fields whose field-vectors point in one direction through the EO waveguide at the left and whose field-vectors point in the opposite direction through the EO waveguide at the right, as indicated in FIG. 9A, which shows an example of the RF E-field vectors obtained when an RF signal is supplied to the electrode structure of FIG. 8A. Since the E-field vectors in the two EO waveguides 40 and 42 point in opposite directions, push-pull modulation of the two EO waveguides can be achieved with a single RF signal applied to the electrode structure through the driven electrodes 44 and 46. Also, both strips of EO waveguides 40 and 42 may have the same crystallographic orientation and poling.

Figure 9C:
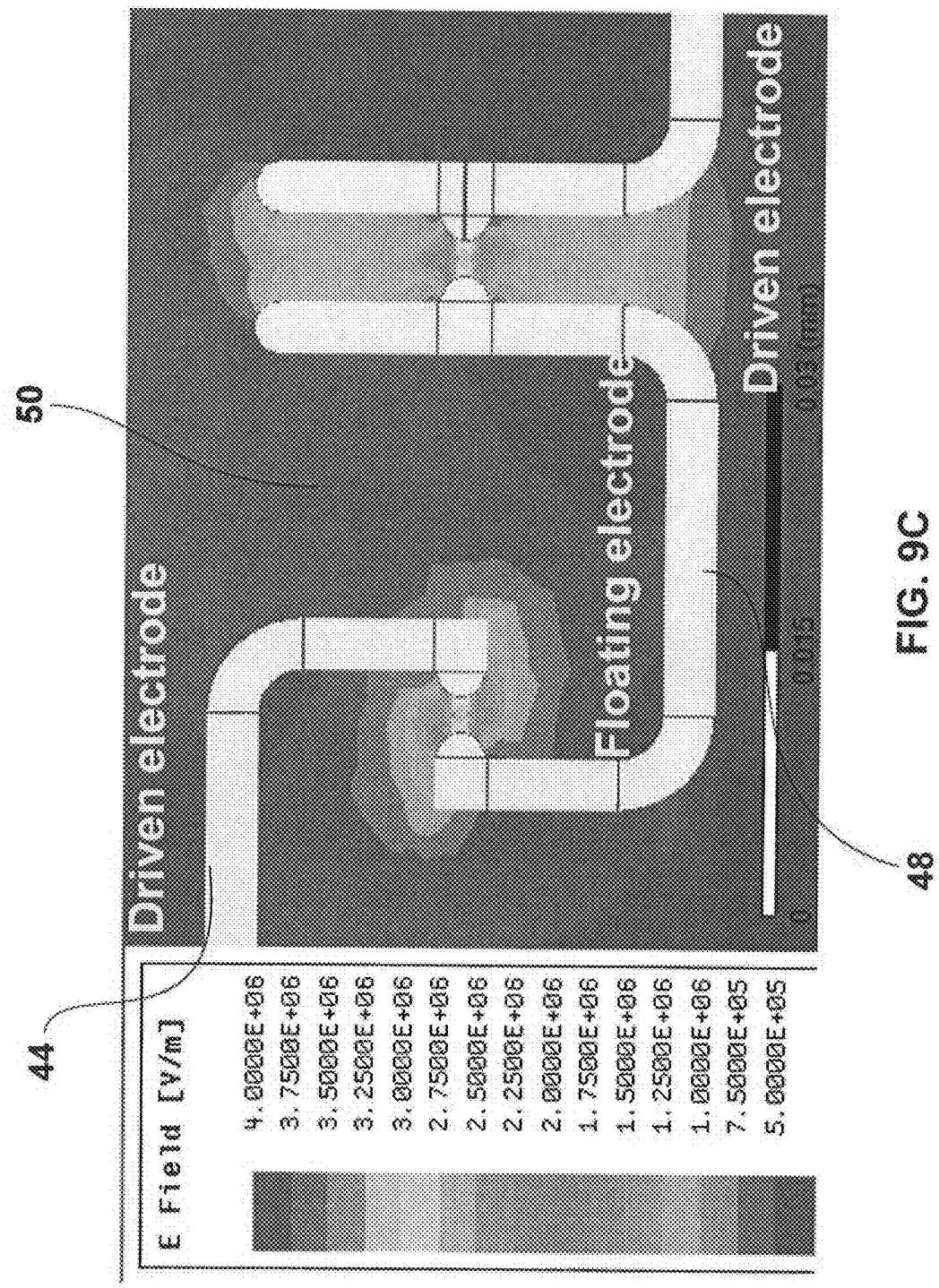

The driven electrode 44 (which, together with a portion of the floating electrode 48, forms the H shape about EO waveguide 40) is coupled to the driven electrode 46 (which, together with another portion of the floating electrode 48, forms the S shape about EO waveguide 42), both through the metal floating electrode 48 and also through the dielectric space 50 with dimension G, as shown in FIG. 8A, between driven electrode 46 and the portion of the floating electrode 48 near the EO waveguide 40 for driven electrode 44. FIG. 9C, which is a plot of the RF E-field intensity distribution, indicates that the RF E-field intensity in the space between the two EO waveguides is non-negligible. However, the strongest RF E-field is between a driven electrode and the floating electrode and is especially strong through the EO waveguide.

The RF electrodes couple to an EO waveguide through metal protrusions 52, 54 of the electrode structures such as driven electrode 44 and floating electrode 48, as shown in FIG. 8B. These protrusions serve to further concentrate the RF E-field in the vicinity of the EO waveguide. Since the dielectric constant of the EO waveguide material is much larger than the dielectric constant of the surrounding cladding material, the RF E-field is directed even more into the EO material rather than through the cladding. The EO waveguides 40, 42 may be fabricated from a thin film of lithium niobate. The crystallographic cut of the lithium niobate is preferably selected to have the axis with a larger EO coefficient aligned with the direction of the E-field, for example in the horizontal direction, as shown in FIGS. 8A and 8B.

FIG. 9A illustrates a configuration in which both driven electrodes 44 and 46 have their external connections located at the top side of the structure. FIG. 9C illustrates a configuration in which one driven electrode has its external connection located at the top side of the structure but the other driven electrode has its external connection located at the bottom side of the structure. Design simulations indicate that these two configurations produce essentially identical RF E-field strengths across the two EO waveguides.

The illustration in FIG. 8A also indicates some of the key geometric parameters of the electrode structure. These parameters include B, the thickness or width of an electrode segment, G, the spacing between the floating electrode 48 adjacent EO waveguide 40 and the driven electrode 46 adjacent EO waveguide 42, L, the length of the electrode extensions in the driven electrode 44, and A, the length of the electrode segments between the area immediately adjacent EO waveguide 40 or 42 and the horizontal electrode segments of driven electrode 44 or 46. These dimensions affect the relative amounts of RF coupling that occurs through the metal of the floating electrode and through the dielectric-filled space 51 between the two EO waveguides.

Figure 10A:
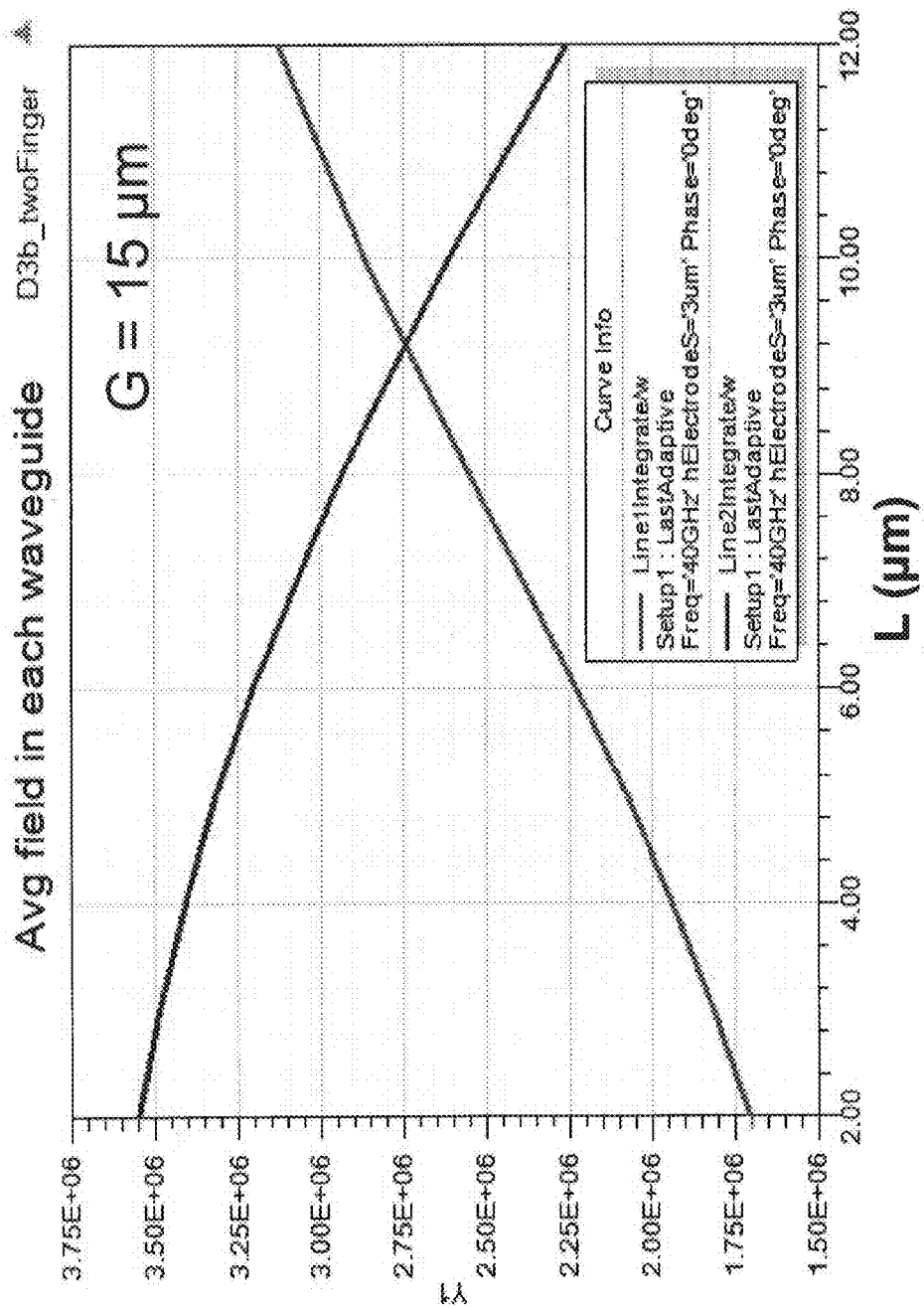
FIGS. 10A and 10B show examples of RF E-field intensity obtained for different values of the electrode structure parameters G and L in accordance with the present disclosure.
Figure 10B:
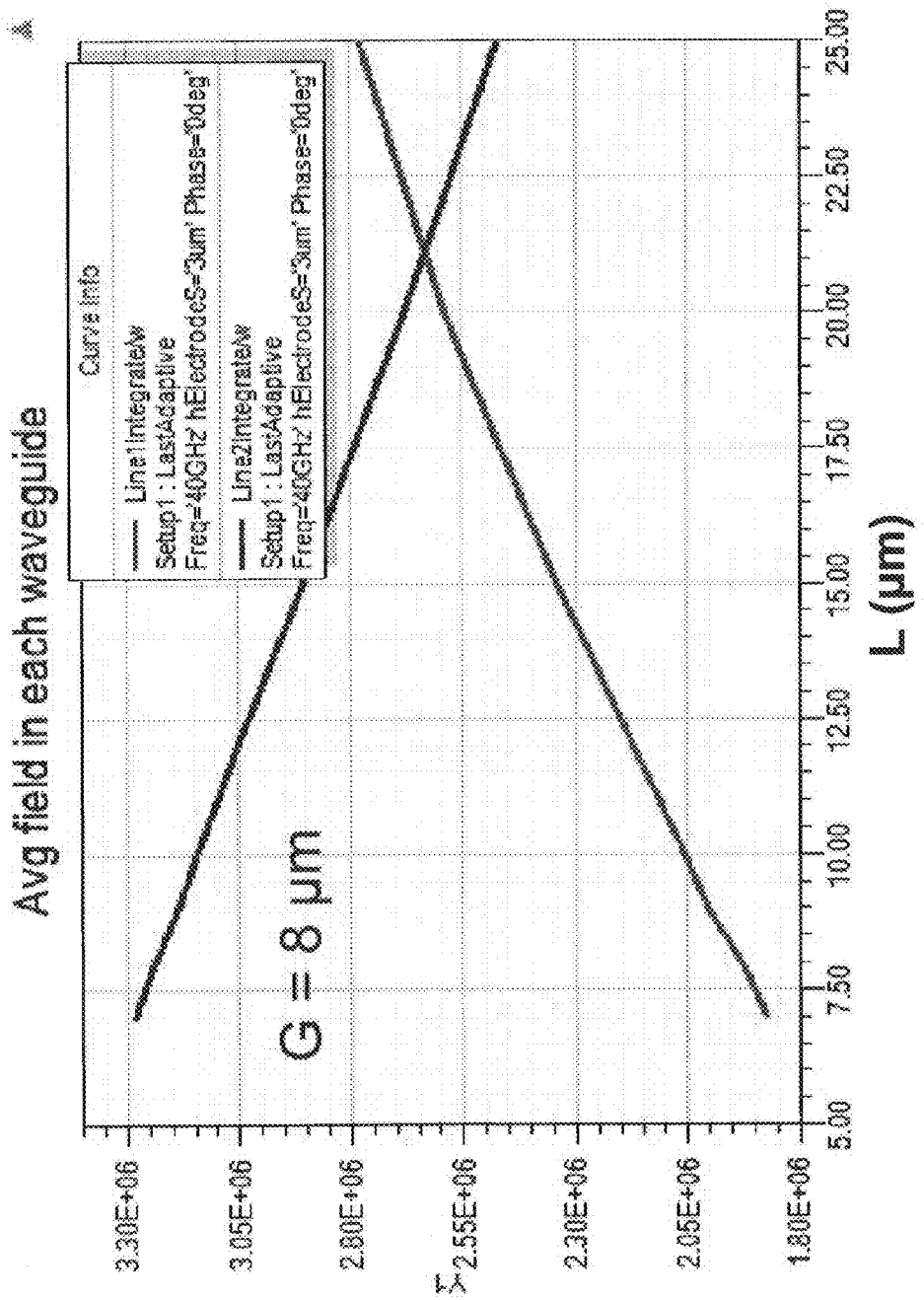

The HS electrode structure shown in FIG. 8A can produce different ratios between the RF E-field intensities in the two EO waveguides. The ratio between these RF E-field intensities depends on the various dimensions of the electrode structure described above. Approximately equal RF E-field intensities are desired in some applications, such as when the two EO waveguides of a Mach-Zehnder interferometer have the same longitudinal length and also carry the same optical power level, and strong extinction of the modulator output is desired. FIGS. 10A and 10B show examples of the dependence of the average RF E-field intensity on the parameters L and G. For each value of G, there is a corresponding value of L for which the RF E-field intensity is the same for both EO waveguides.

The tables shown in FIG. 9B give examples of the calculated relative E-field intensity values, when the E-field intensities in both EO waveguides are the same, and the RF attenuation (S21) for several different designs of the electrode structure of FIG. 8A. For these examples, the electrodes 44, 46, and 48 are assumed to be constructed from gold material. As the length of the floating electrode 48 is reduced, by making the parameters G or A smaller, the parameter L should be made larger if achievement of equal E-field intensities in the two EO waveguides is desired. However, making L larger increases the coupling through the dielectric cladding but also increases the amount of RF field in the driven electrode 44 of the H electrode portion that bypasses its EO waveguide. Thus, L should not be made too large. The electrode extensions of length L serve to supplement the coupling that occurs through the floating electrode 48 metal. When the electrode material has lower resistive loss, the length of those extensions can be reduced. This reduction of L also reduces the amount of RF field that bypasses the EO waveguide at the H electrode portion and thus is wasted.

The values in the tables shown in FIG. 9B also indicate that the changes in the E-field intensity and the RF loss are fairly small. The required RF voltage that must be applied to achieve a given depth of modulation of the output light from a modulator depends on the product of the RF E-field intensity, the length of the EO waveguide, and the length of the RF electrode 44 or 46 for a given allowable attenuation of the propagated RF field, such as 3 dB. For example, the variations in the parameters that have been considered resulted in a change of less than 5% for the value of this product.

Figure 11:
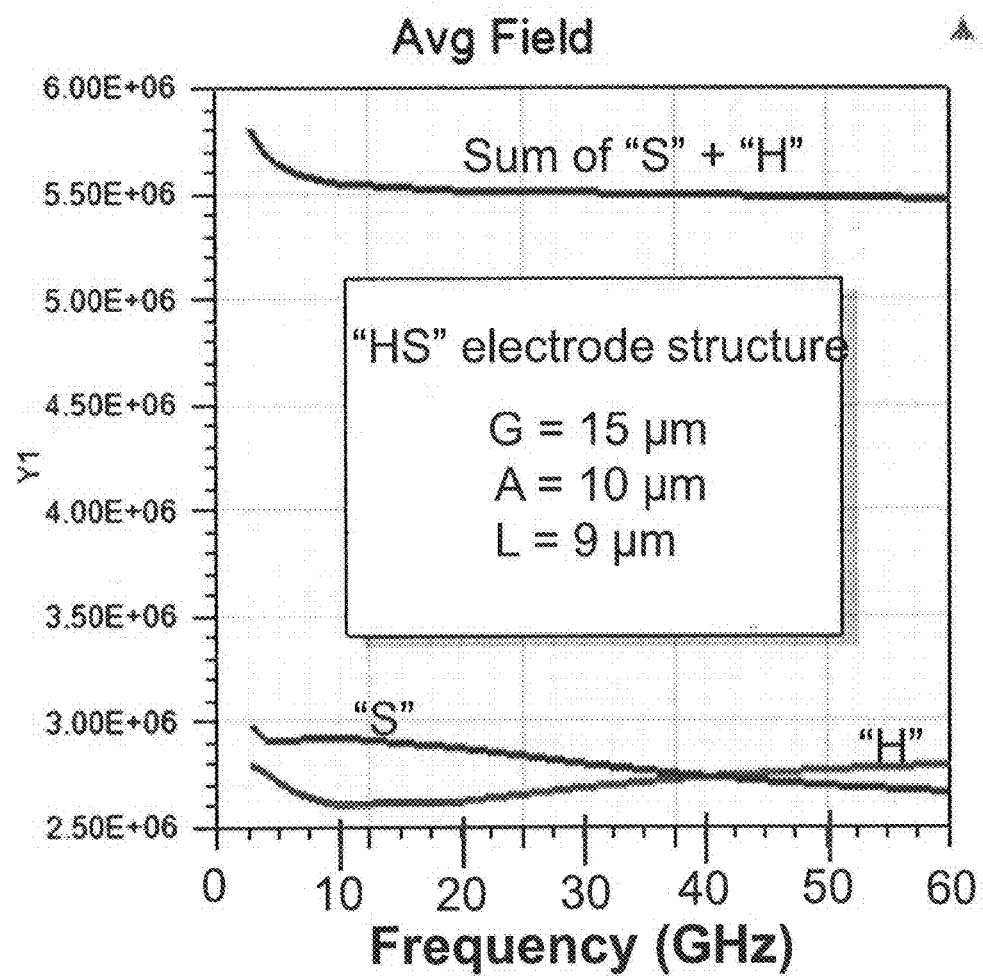
FIG. 11 shows an example of RF E-field intensities in the two EO waveguides calculated for different signal frequencies in accordance with the present disclosure.

A given electrode design achieves exactly equal E-field strengths in the two EO waveguides 40 and 42 for only one signal frequency. However, reasonable balance in the RF E-field strengths is still achieved over a broad range of frequencies. FIG. 11 shows an example of the RF E-field strengths obtained for different frequencies. The E-field strength varies by only ±2.2% over the frequency span of 30 GHz to 60 GHz. Different electrode designs can be optimized to achieve the condition of balanced E-fields strengths over different frequency ranges. The optical-intensity modulation produced by push-pull Mach-Zehnder modulators depends on the sum of the E-field strengths in the two phase-modulation arms of that modulator. FIG. 11 also shows that the sum of the E-field strengths in the two EO-waveguides is nearly flat with frequency, from 10 GHz to well beyond 60 GHz, with only a slight drop as the frequency is increased.

Figure 12:
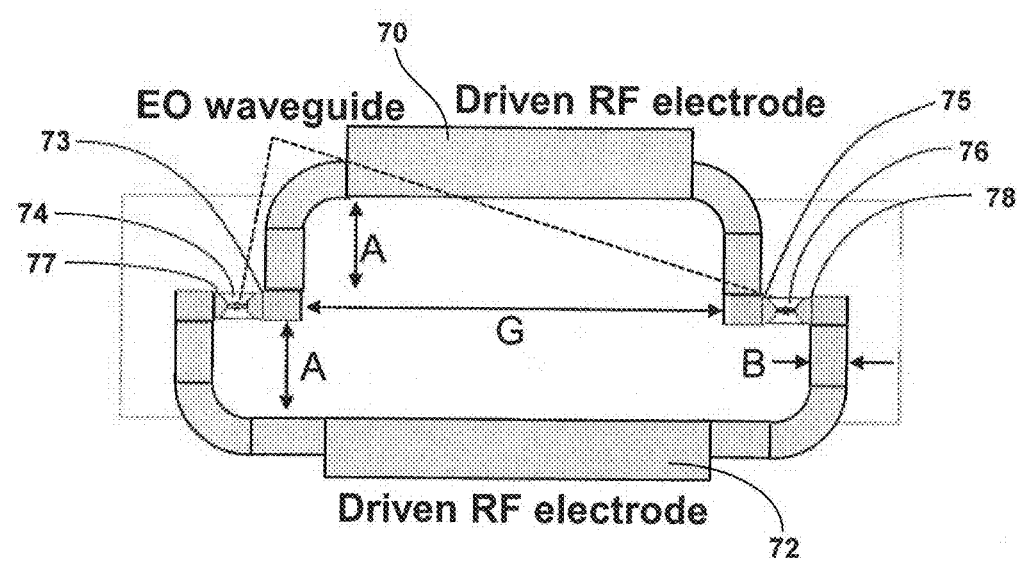
FIG. 12 shows a cross-sectional illustration of an electro-optic modulator structure with a pair of driven RF electrodes in accordance with the present disclosure.

Another electrode structure with two driven electrodes that achieves push-pull modulation is illustrated in cross section in FIG. 12. One driven electrode 70, which has an inverted U shape, in FIG. 12, is coupled to the inner edges 73, 75 of the two EO strips 74, 76 of the optical waveguides. The other driven electrode 72, which has a U shape in FIG. 12 and is inverted relative to the first driven electrode 70, is coupled to the outer edges 77, 78 of those two EO strips 74, 76. This electrode structure can achieve push-pull modulation without needing to include a floating electrode. However, this "double U" structure splits the RF signal between the two metal paths to the electrode portions near the two EO waveguides. Thus, the equivalent RF impedance of this structure, which has an electrical parallel connection, is lower compared to the impedance of the HS electrode structures of FIG. 8A, for which some of the RF signal passes first through one EO waveguide and then through a second EO waveguide, in an electrical series connection.

Figure 13A:
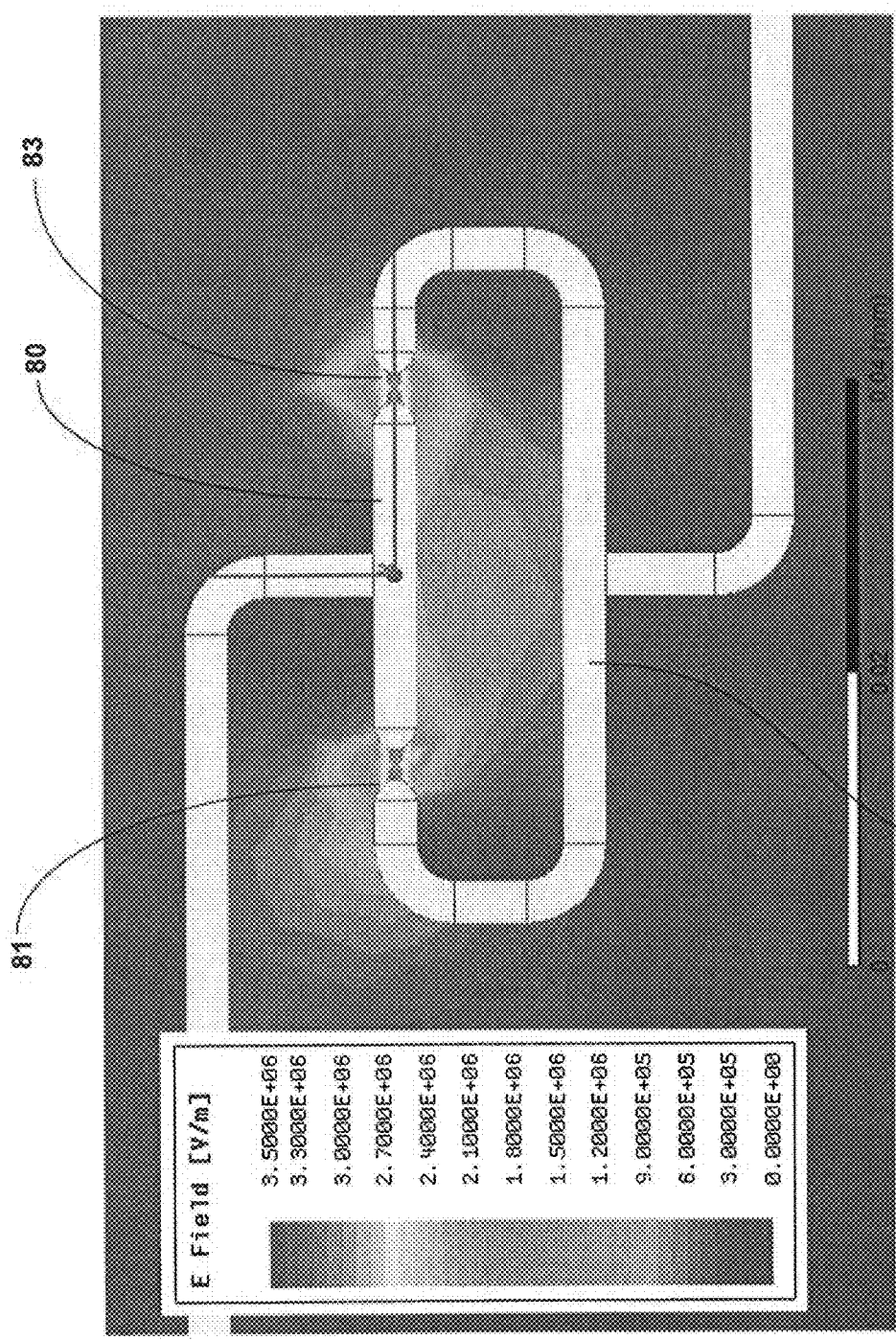
FIGS. 13A, 13B, 13C and 13D show examples and graphs from simulations of an electrode structure with two driven RF electrodes.
Figure 13B:
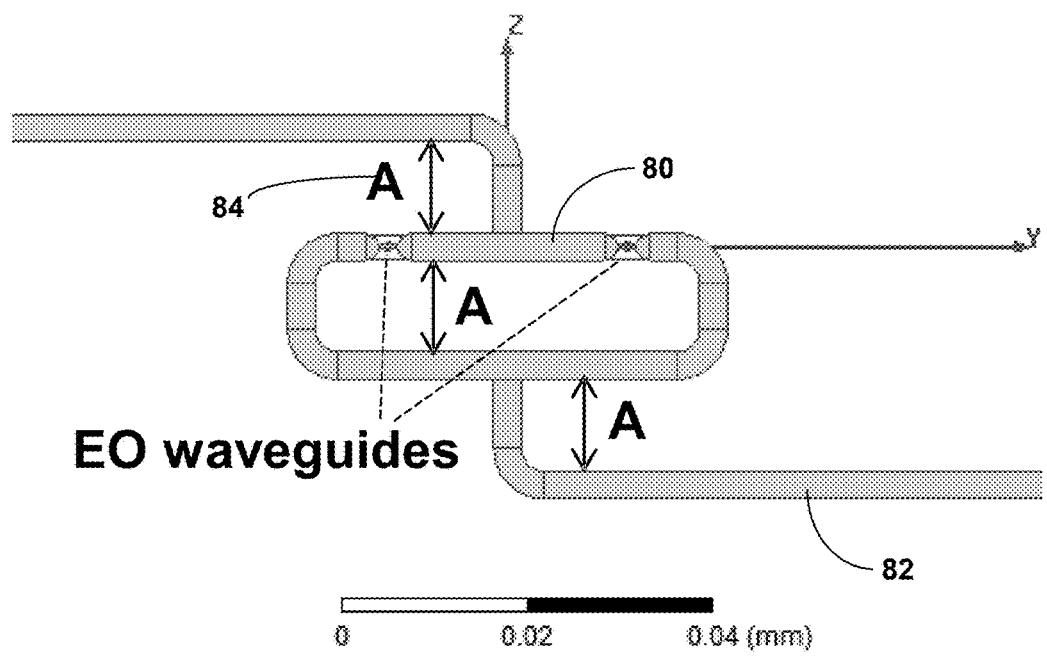
Figure 13C:
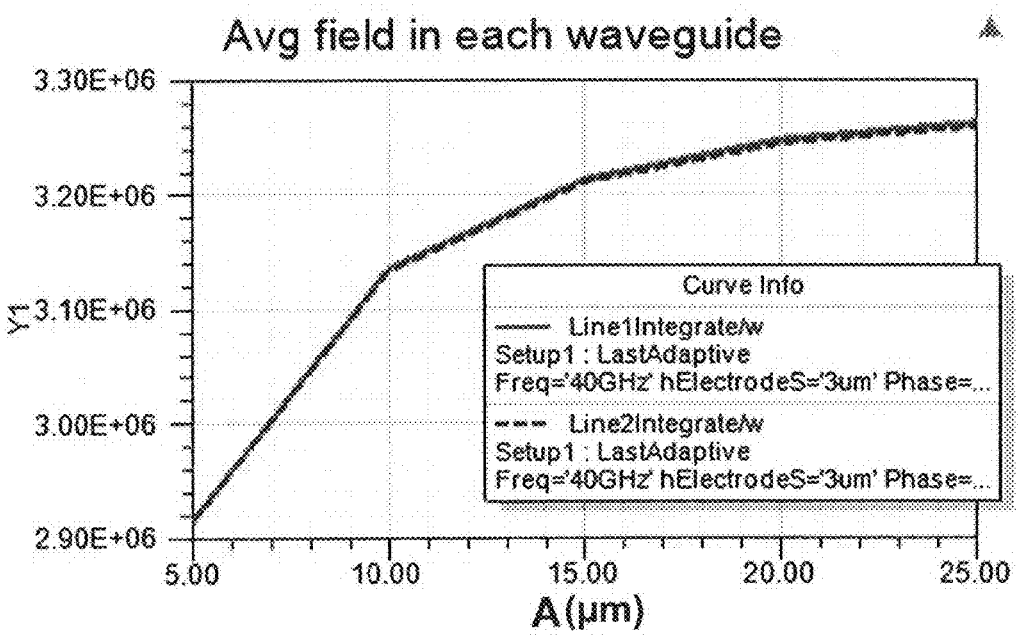
Figure 13D:
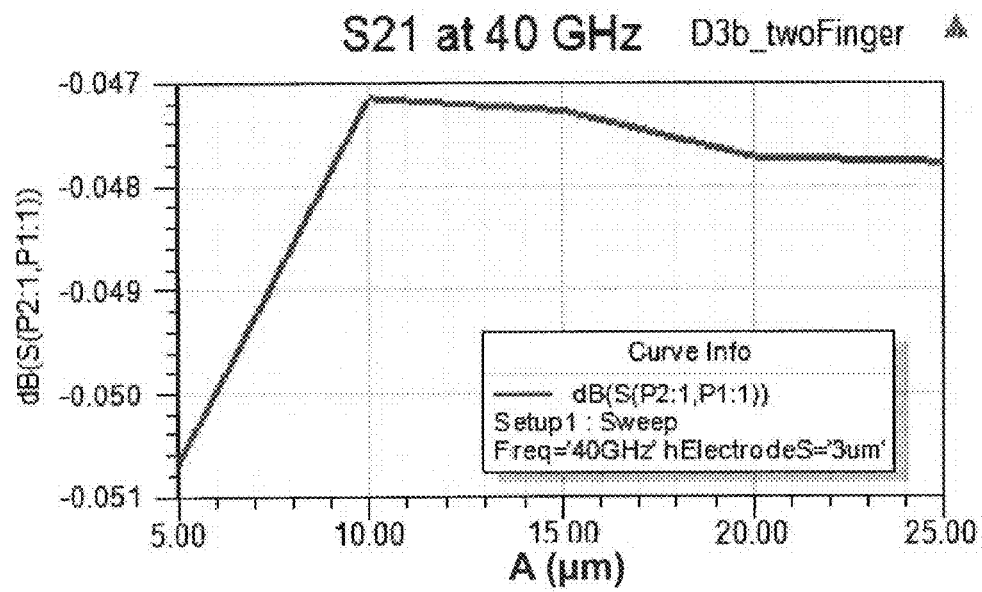

To highlight some constraints on the design of this "double U" electrode structure, FIG. 13A shows simulation results for a variation of the modulator structure of FIG. 12 that has its upper driven electrode 80 flattened instead of having an inverted U shape. FIG. 13A shows a plot of the RF E-field intensity obtained in one simulation example. The strongest E-field intensity is at the two EO waveguides 81, 83, as desired. When the spacing parameter A 84 shown in FIG. 13B is small (e.g., <10 μm in this example), the E-field strength in the EO waveguides is much lower, because a significant amount of the RF E-field bypasses those EO waveguides and instead is coupled directly through the dielectric cladding from one driven electrode 80 to the other driven electrode 82. However, for larger values of the spacing, A 84, additional increases in that spacing gradually increase the E-field strength in the EO waveguides but also increase the RF loss, as shown in FIGS. 13C and 13D, respectively. For the structure simulated, the value of the product of the RF E-field at the EO waveguides 81, 83 times the loss-determined length of the EO waveguide is comparable to, but slightly lower than, the value for this product that is obtained for the "HS" electrode structure of FIG. 8A.

Figure 14A:
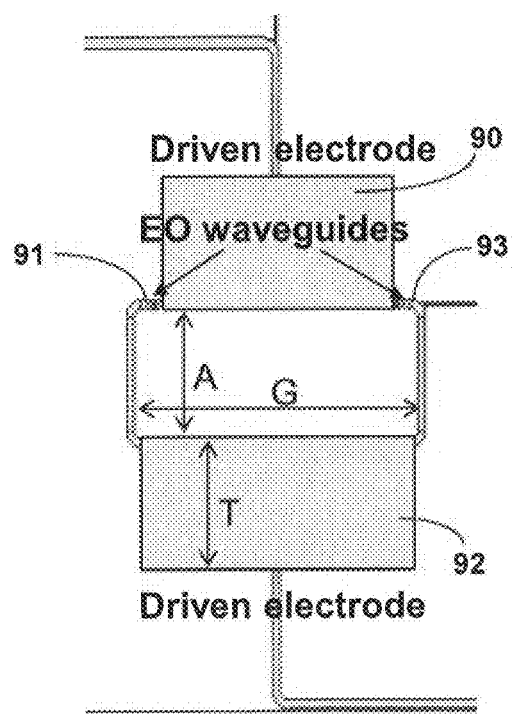
FIGS. 14A, 14B, 14C, 14D, 14E, 14F and 14G show additional examples from simulations of an electrode structure with two driven RF electrodes: showing dependence of RF E-field intensity in EO waveguides, and RF loss and equivalent impedance of the electrode structure on the parameters T and A (for G >50 μm) in accordance with the present disclosure.
Figure 14B:
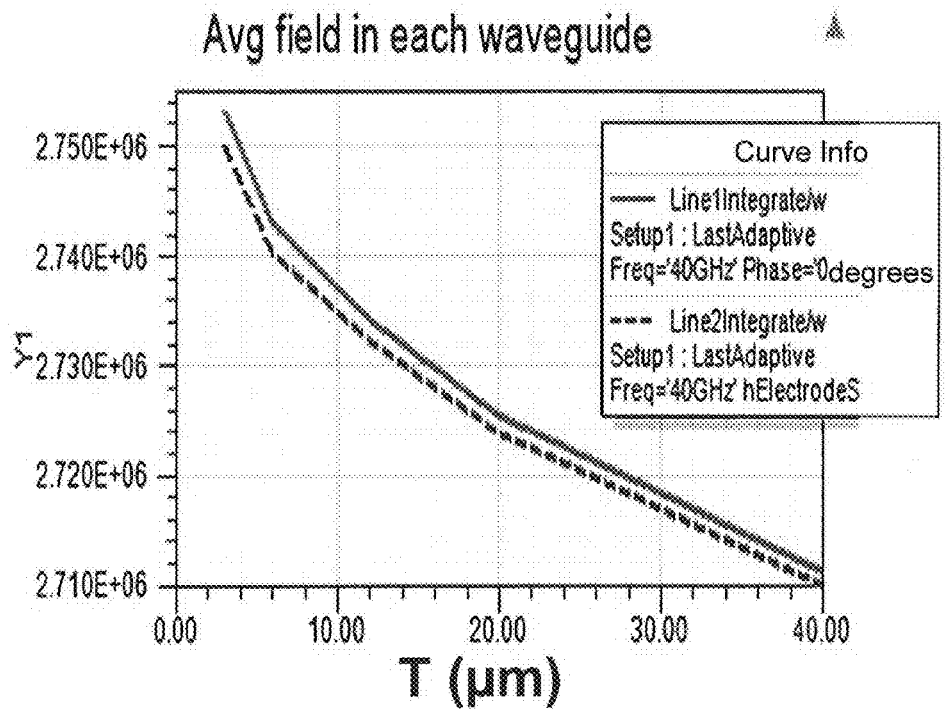
Figure 14C:
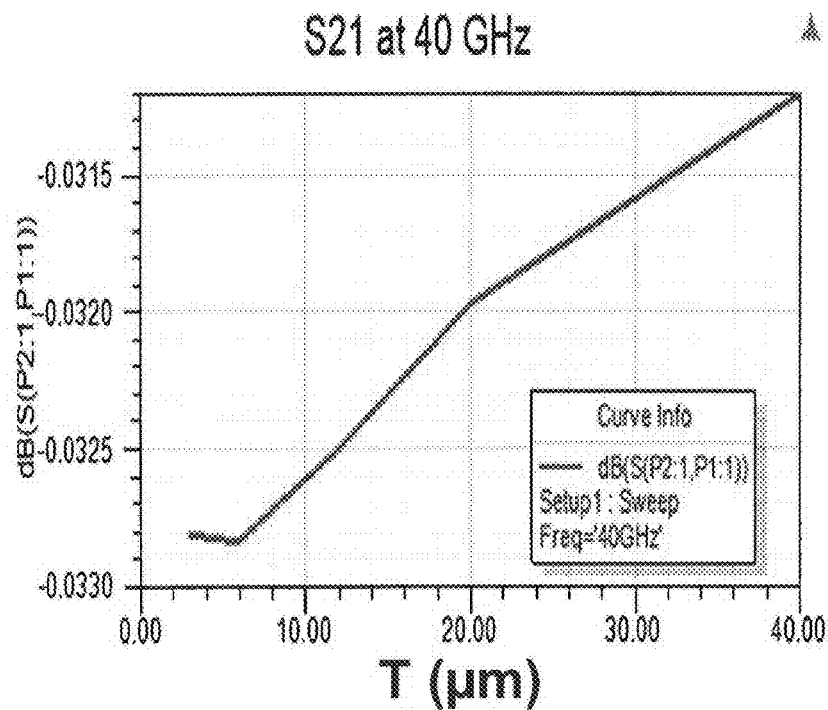
Figure 14D:
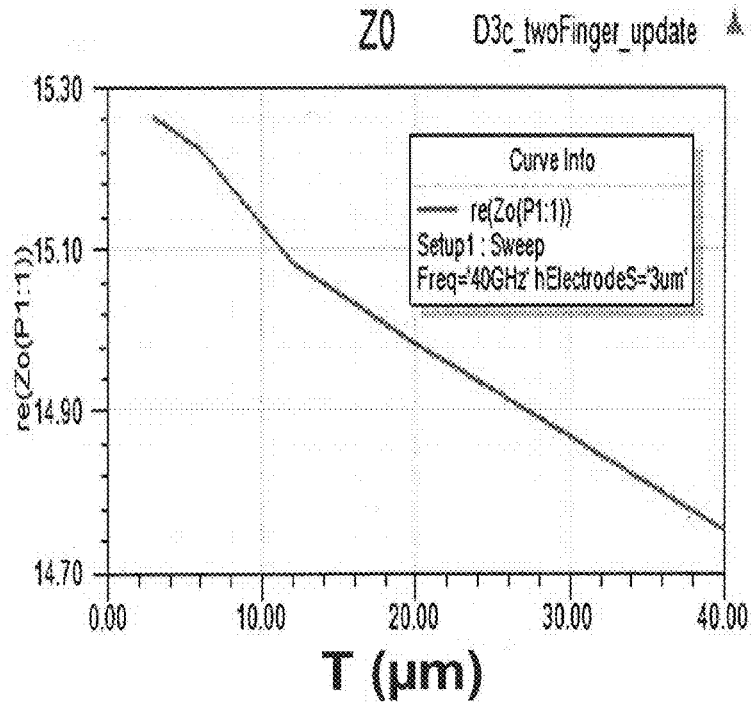
Figure 14E:
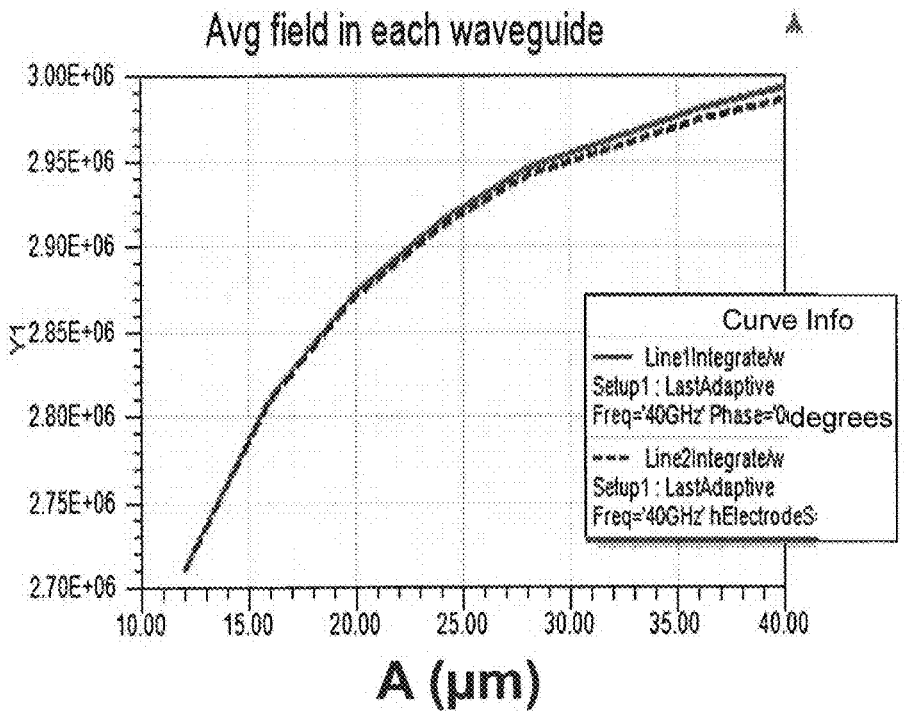
Figure 14F:
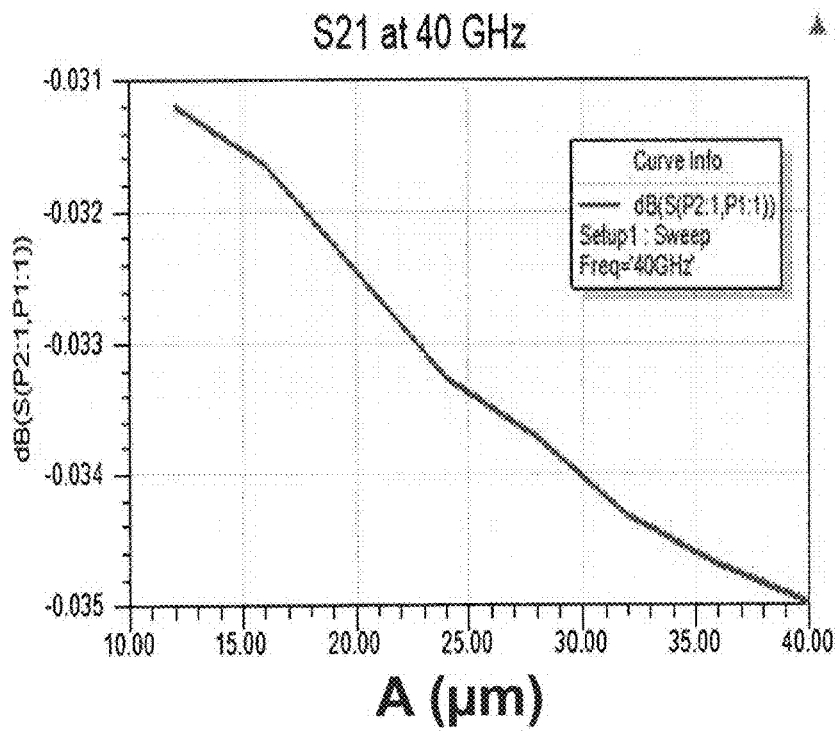
Figure 14G:
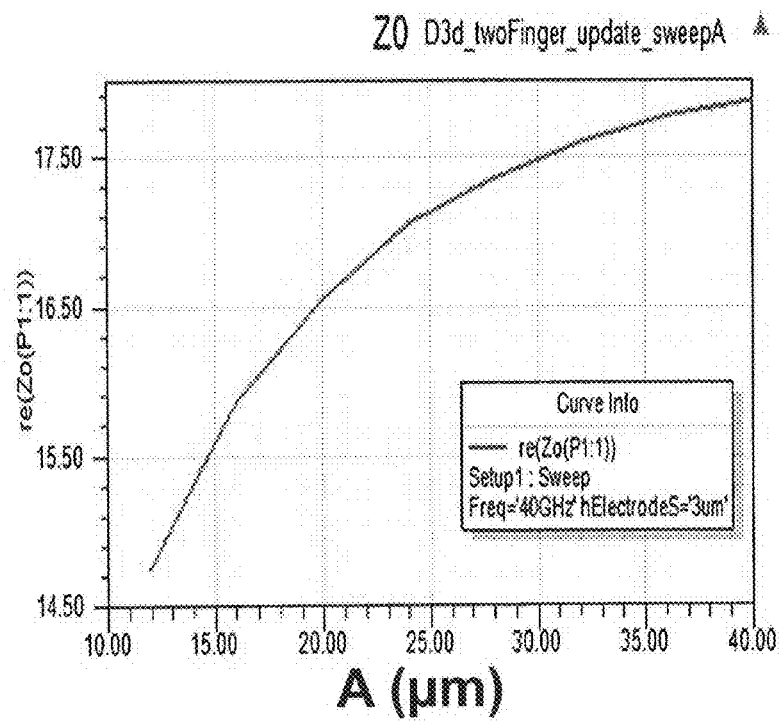

FIGS. 14A to 14G show simulation results for another variation of the electrode structure of FIG. 12. Both of the driven electrodes may be located away from the EO waveguides, as illustrated in FIG. 12. Alternatively, one of the driven electrodes 90 may be located in-line with the EO waveguides 91, 93, as illustrated in FIG. 14A. To reduce the RF loss at high frequencies, the width of the driven electrodes is preferably fairly large (>50 µm). The results plotted in FIGS. 14B-14G show that the RF loss, as indicated by the value for S21, is reduced by increasing the thickness of the driven electrodes 90, 92. However, the RF E-field in the EO waveguides is lower, primarily because more of the field in the upper driven electrode 90 which is in-line with the EO waveguides, bypasses those EO waveguides. As the spacing parameter A, shown in FIG. 14A is made larger, the RF E-field in the EO waveguides 91, 93 is increased because less of the RF field is coupled directly between the two driven electrodes 90, 92 and thus bypasses the EO waveguides 91, 93. However, the RF loss increases because the conductive loss of the metal portions is higher. For the "double U" or the "single U" electrode structures, the characteristic RF impedance Z0 is quite low (<25 Ohms) because the RF signal is divided between two conductive paths.

FIG. 8B illustrates the detailed structure of the EO waveguide 40 and its optical waveguide 43 and the portion of the RF electrode 44 and the floating electrode 48 adjacent to that optical waveguide. The optical waveguides include a thin strip of the EO material 43, such as lithium niobate. The strip 43 has a rectangular shape, with a pair of opposing longer sides 63 and a pair of opposing shorter edges 61. The RF electrodes 44, 48 are located at the two shorter edges 61 of this EO strip 43. The spacing between the two electrode protrusions 52, 54 that abut either lateral-side edge of the EO waveguide strip 43 affects the loss of the light guided in that EO waveguide and also the strength of the RF E-field across the waveguide obtained for a given applied modulation voltage. The EO waveguide 43 also includes thin strips of non-electro-optic material 53 that abut one or both of the longer sides of the EO strip 43. The strips of non-electro-optic material 53 act as ribs in the optical-waveguide structure that serve to concentrate the guided optical field at the center of the EO strip 43 and away from the metal electrodes 52, 54 at the edges of the EO strip 43. Oxide spacers 60 separate the electrodes 44, 48 from the EO strip 43. The EO strip 43 is a dielectric and an electrically non-conducting material, so insulation of the EO strip 43 from the electrodes is not needed. However, what is needed is a low-refractive-index material to separate the metal electrodes from the high-refractive-index material of the EO strip 43, which is further discussed below.

Figures 15A, 15B, 15C:
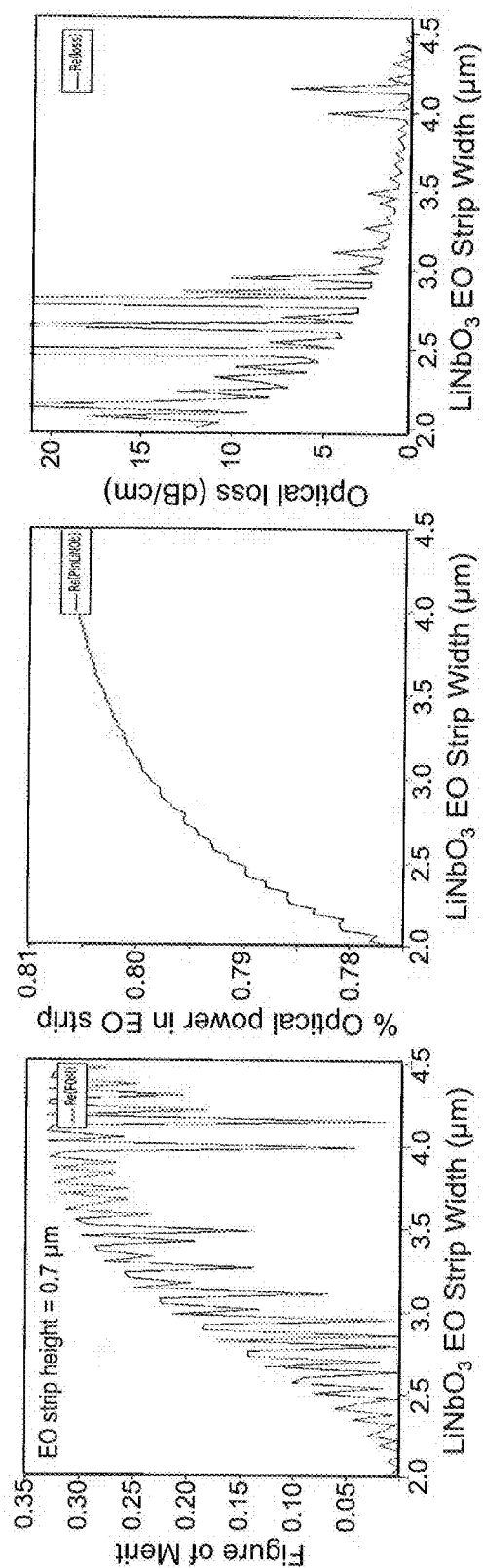
FIGS. 15A, 15B and 15C show examples of optical simulation results for an electro-optic waveguide structure with RF electrodes located at the edges of the EO strip.

An optical figure of merit (FOM) can be defined that considers a combination of the electrode spacing, which affects the RF E-field strength, the transmission of the guided light for a given modulation length, as determined by the optical loss, and the percentage of the optical field that overlaps the EO material in the optical waveguide. FIGS. 15A, 15B, and 15C plot examples of simulation results that illustrate the dependence of this FOM on the width of the EO strip. The plotted curve in FIG. 15A shows that there is a range of strip widths for which the FOM is maximized, such as from 4.0-4.5 µm. For much wider strips, the RF E-field is reduced. For much narrower strips, the optical loss from overlap of the optical field with the metal electrode protrusions is increased, as shown in FIG. 15C. The sharp spikes, peaks and dips, in the plotted curves are results of simulation artifacts.

Figure 16:
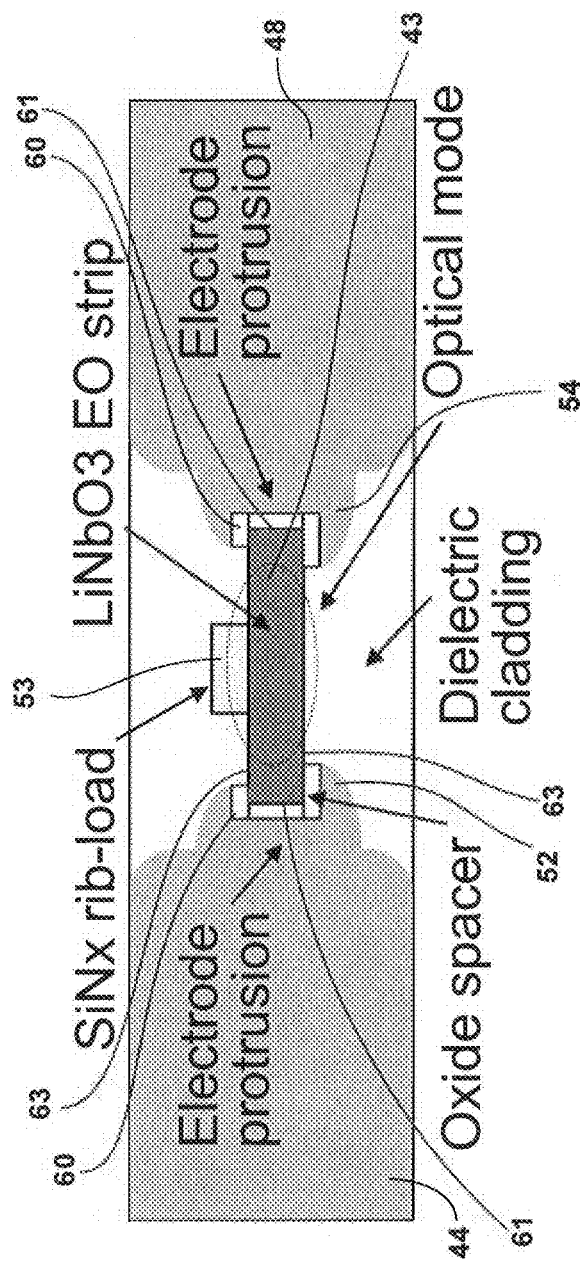
FIG. 16 shows a cross-sectional illustration of an EO waveguide and the RF electrode portions adjacent the EO waveguide in accordance with the present disclosure.

FIG. 16 illustrates another example of an EO waveguide and the electrode protrusions 52, 54 adjacent to the EO strip 43 in that waveguide. For this example, the rectangular-shape strip of EO material 43 has a rib 53 of non-electro-optic material against one of the long sides 63 of that strip 43, such as the top side as shown in FIG. 16. Portions of the electrode protrusions 52, 54 extend beyond the short-side edges 61 of the EO strip 43 and overlap parts of the long sides 63 of the EO strip 43. The metal electrodes 52, 54 can be extended to overlap the outer parts of the bottom of the EO strip 43 without substantially increasing the optical loss because the waveguide rib 53 is located only on the top side of the EO strip. The rib 53 draws the optical field upward and away from the bottom of the EO strip 43, and thus farther away from those electrode extensions 52, 54. Small extensions of the electrodes 52, 54 also may be allowed on the top side of the EO strip 43, the side abutted by the rib 53, because the guided optical mode profile has an elliptical shape. Thus, the optical field intensity is weakest at the corners of the EO strip 43. Oxide spacers 60 separate the electrodes 48, 44 from the EO strip 43.

Figure 17A:
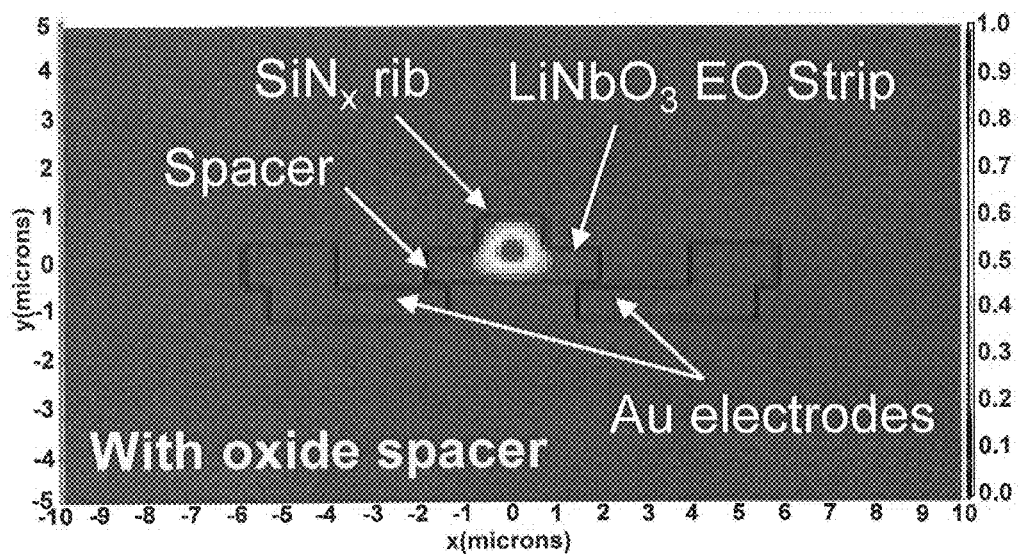
FIGS. 17A and 17B show examples from simulations of EO waveguide structures that have extensions of the electrode that overlap a bottom surface of the EO strip in accordance with the present disclosure.
Figure 17B:
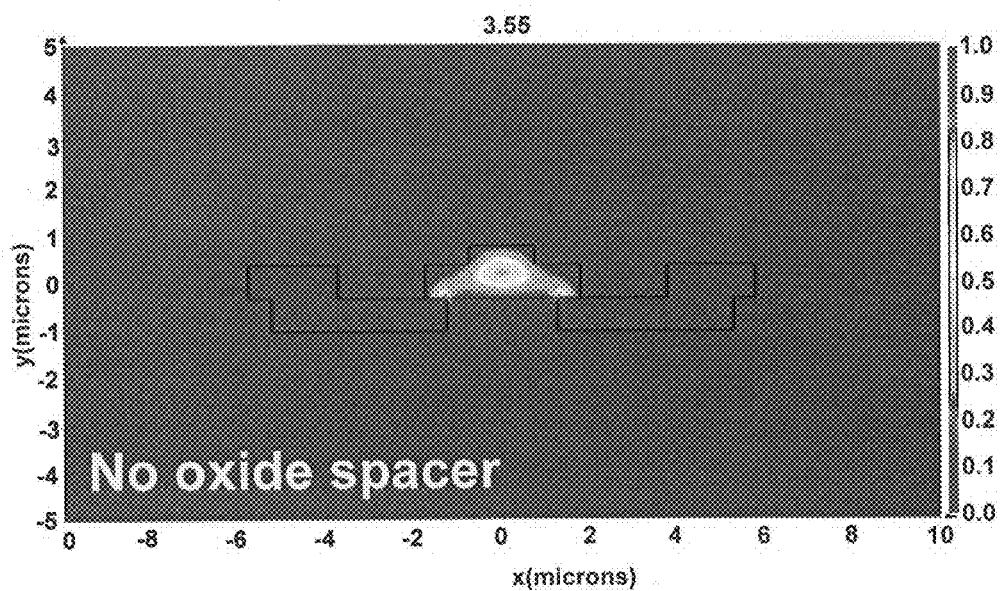

FIGS. 17A and 17B illustrate the benefit of having a thin spacer 60 of low-refractive-index material, such as silicon dioxide, between the lithium niobate EO strip 43 and the metal electrodes 44, 48. The plot of the optical-field intensity profile shown in FIG. 17A is for a structure that has such a spacer 60. In comparison, the plot of the optical-field intensity profile, shown in FIG. 17B, is for a structure that does not have this spacer and shows that there is substantial coupling of the optical field centered in the waveguide with surface-plasmon modes that can be present near the metal surfaces 52, 54. The presence of the low-refractive-index spacer 60 causes the guided light to be drawn into the higher-refractive-index EO material 43 and away from the metal 52, 54, thereby avoiding coupling with the surface-plasmon modes.

When lithium niobate is the material for the EO strip 43, silicon nitride ($SiN_x$) is a good material for the non-electro-optic rib 53 because the composition of the silicon nitride can be adjusted to obtain a material whose optical refractive index is equal to, slightly greater than or slightly less than the refractive index of the lithium niobate 43. The cross-sectional dimensions of the rib 53 can be designed to optimize the optical FOM value.

Figure 18:
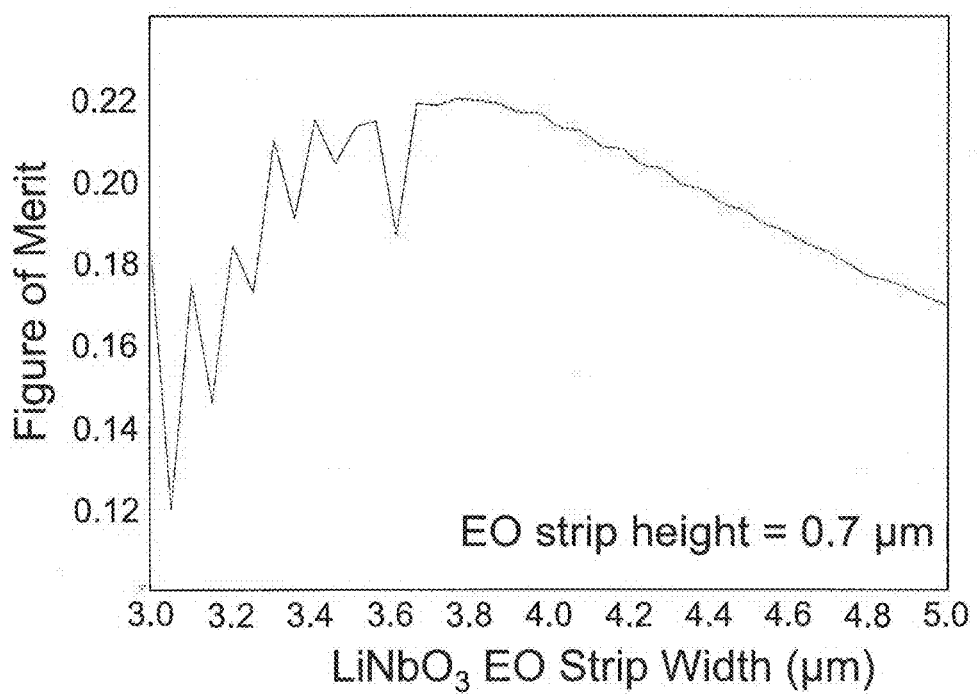
FIG. 18 shows an example of simulation results for an electro-optic waveguide structure with electrode extensions underneath the EO strip in accordance with the present disclosure.

FIG. 18 shows an example of simulation results obtained for the structure of FIG. 17A that has an extended electrode protrusion under the EO strip 43 and a silicon nitride rib 53 above the EO strip 43. The plotted results indicate that there is a range of EO strip widths for which the FOM is maximized, for example from 3.5 to 4.0 µm. The fluctuations in the optical FOM obtained for smaller strip widths are an artifact of the simulation calculations. The specific pattern of those fluctuations and the specific strip-width values for the peak and dips in the calculated curve change as the grid-spacing used in the simulation model changes. For the structure whose simulation results are shown in FIG. 18, the electrode protrusions extend 0.6 µm beyond each edge of the EO strip 43 and under the wide side of that EO strip 43. Thus, the optimal gap between those extensions of the electrodes 52, 54 is approximately 2.5-3.0 µm.

The extensions of the electrode protrusions adjacent to the EO waveguide can potentially achieve a somewhat higher RF E-field intensity in the EO strip 43 for a given overall electrode structure while maintaining the same optical loss.

Figure 19A:
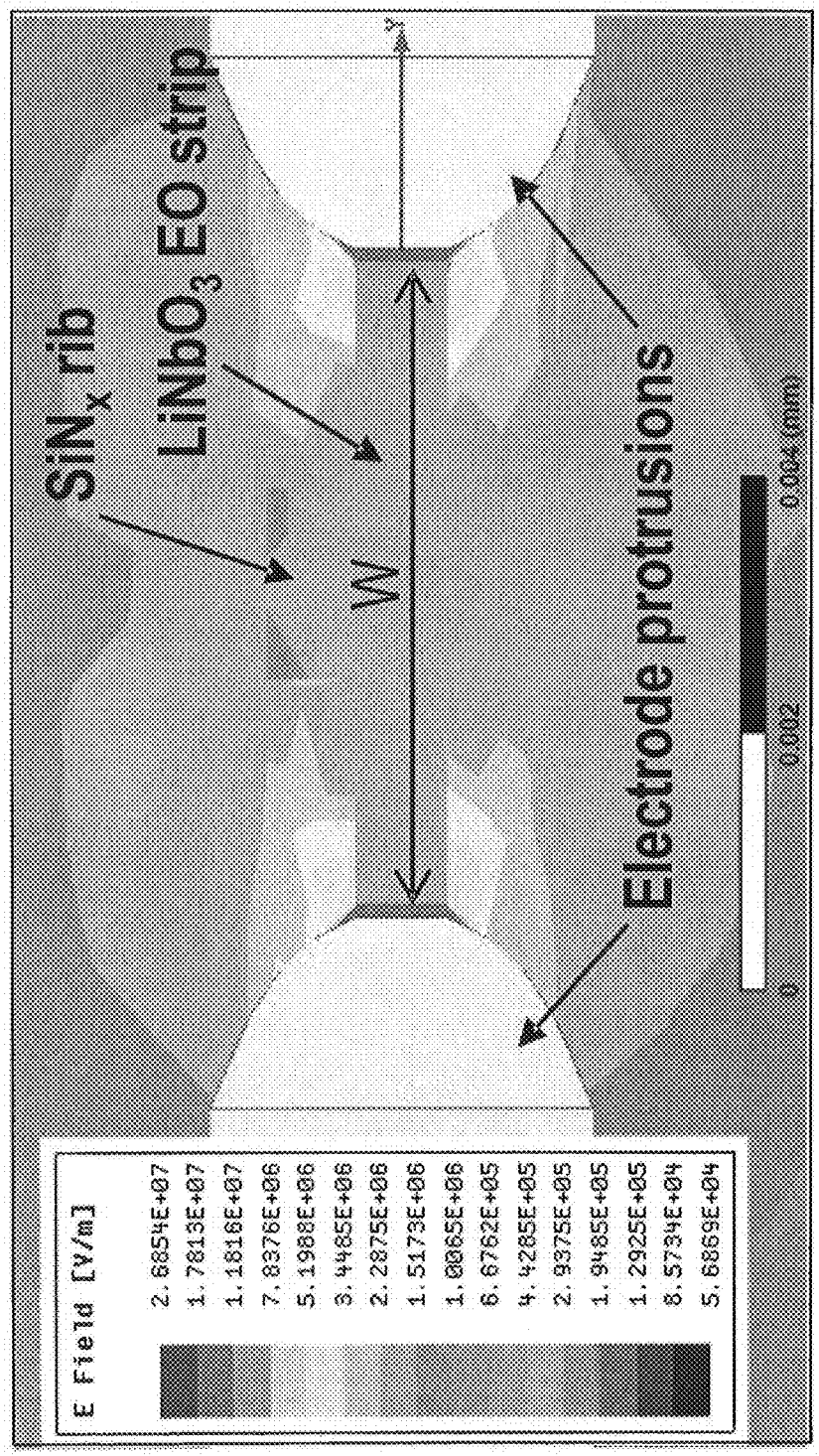
FIGS. 19A, 19B, 19C, 19D, 19E, 19F and 19G show examples of simulation results for the modulator electrode structure of FIG. 88 ("normal") and modulator electrode structure of FIG. 16 ("crab"). in accordance with the present disclosure.
Figure 19B:
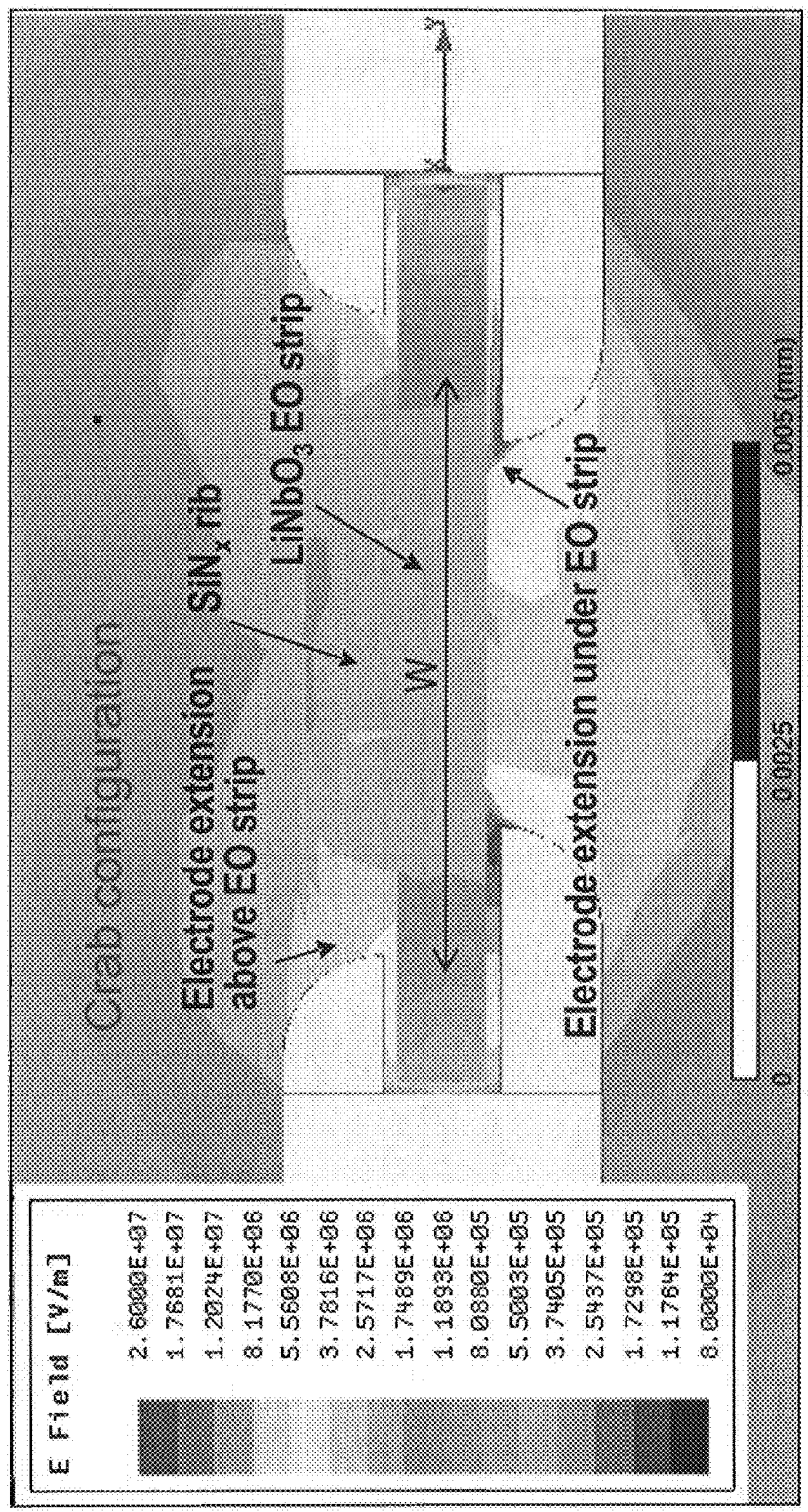
Figure 19C:
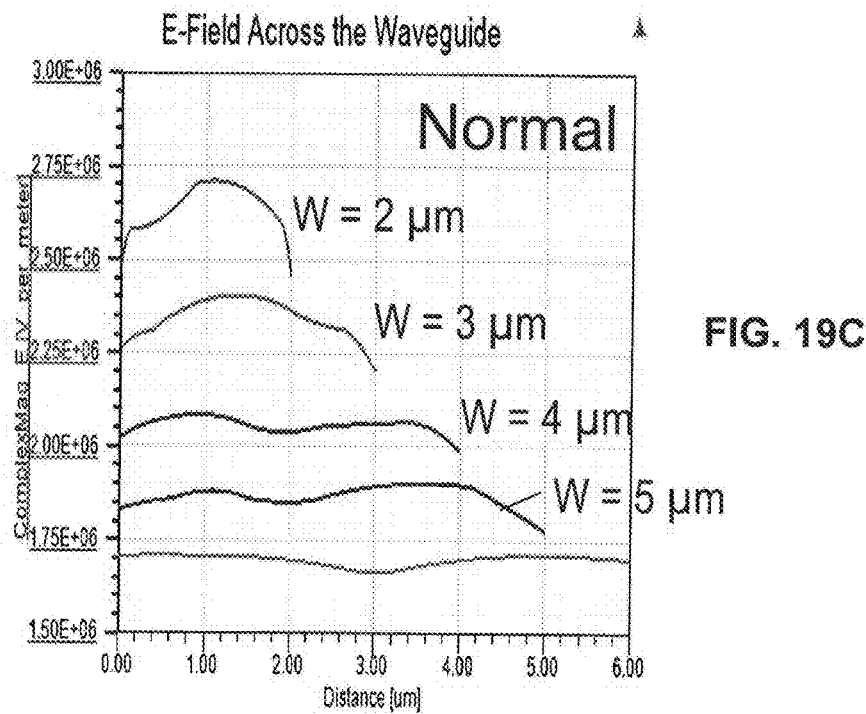
Figure 19D:
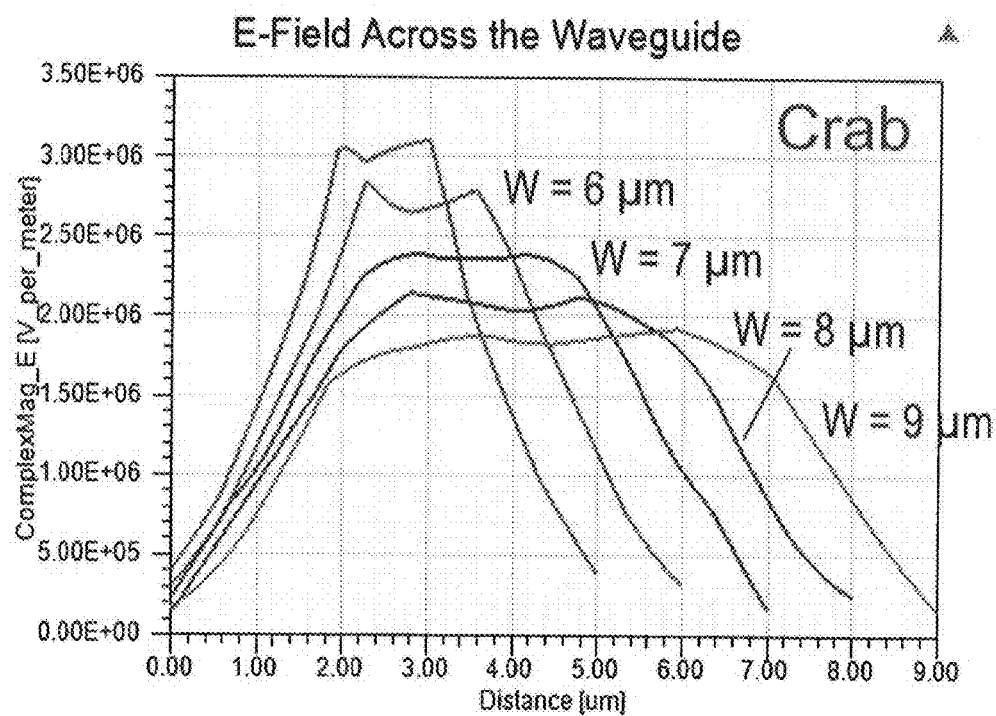

FIGS. 19A, 19B, 19C, 19D, 19E, 19F, and 19G compare simulation results obtained for the structures illustrated in FIG. 8B, the "normal" structure, and in FIG. 16, the "crab" structure. The EO 43 strip is separated from the metal of the electrode protrusions 52, 54 and their extensions by a thin gap filled with silicon dioxide 60 in these examples. The RF E-field intensity is highest in these gaps and especially where the two electrodes 52, 54 at either side of the EO strip 43 are closest to each other, as shown in FIGS. 19A and 19B. For the "crab" structure, each of the two extensions of the electrode protrusions 52, 54 located underneath the EO strip extend 2 µm beyond the edge of the EO strip 43. Thus, the effective spacing between the two electrodes 52, 54 on either side of an EO strip 43 is roughly 4 µm smaller than the effective spacing would be for the "normal" structure. If we compare the "normal" structure with an EO strip width of 4 µm to the "crab" structure with an EO strip width of 8 µm, the results shown in FIGS. 19A and 19B indicate that both of these structures have nearly the same RF E-field strength.

Figure 19E:
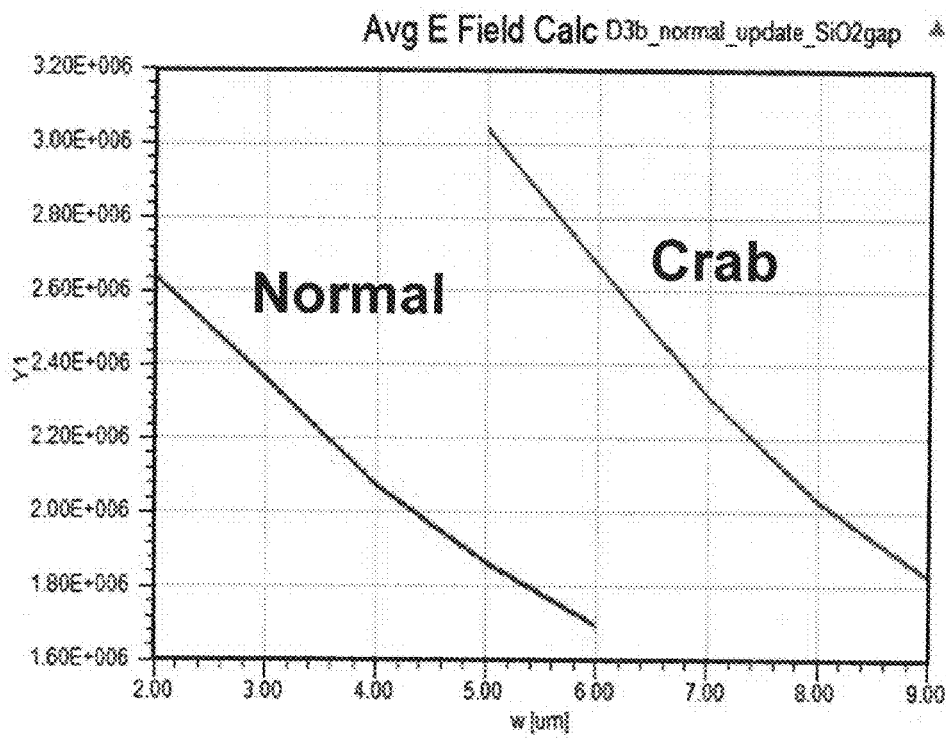
Figure 19F:
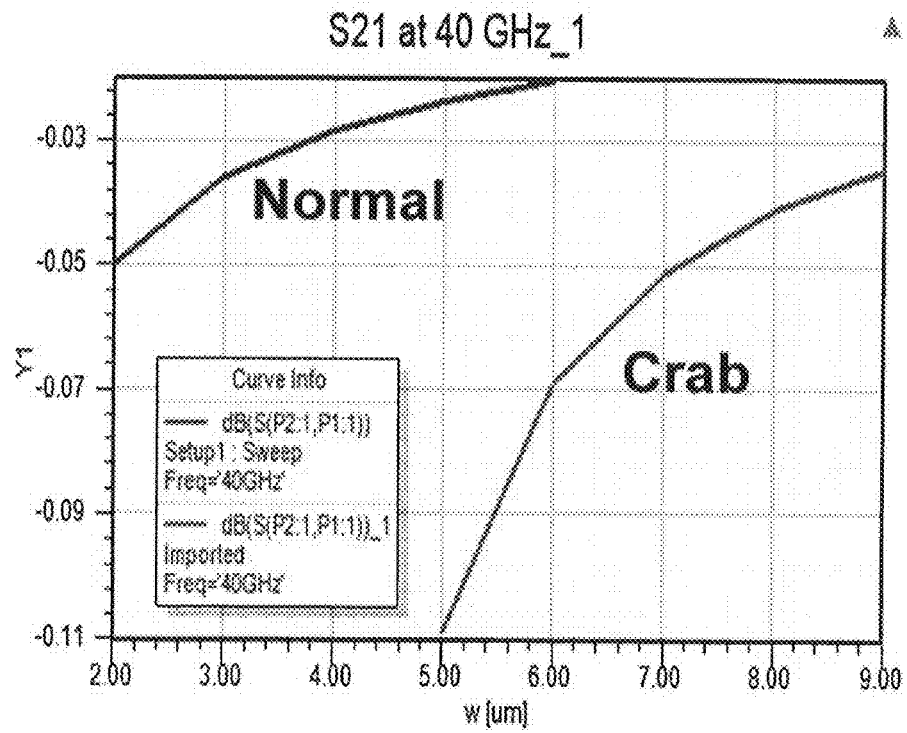
Figure 19G:
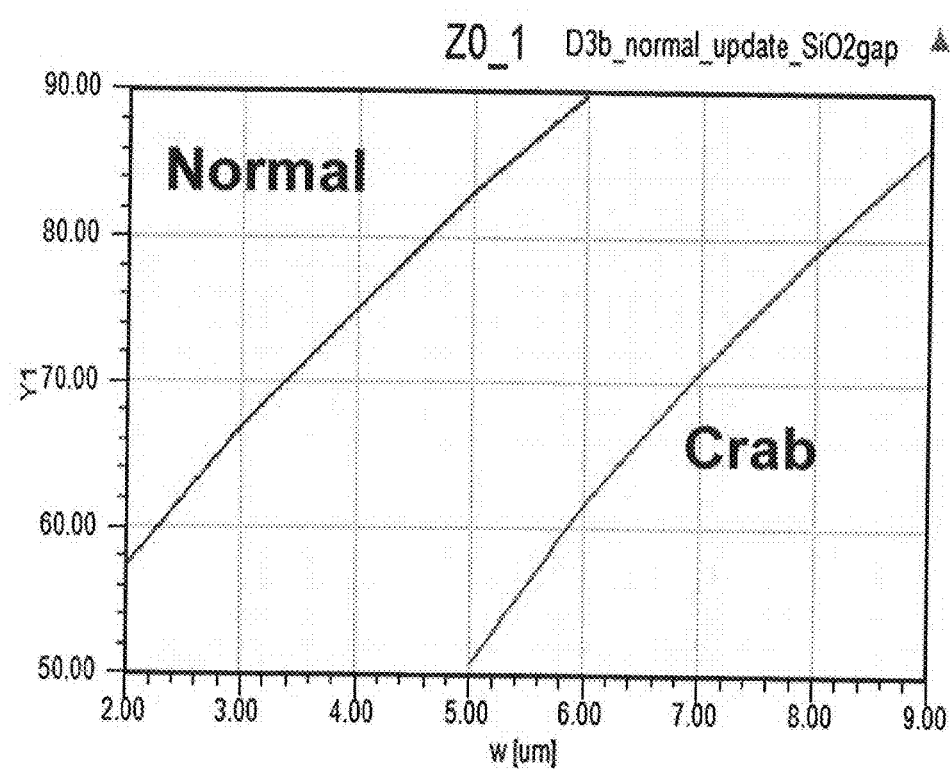

The RF E-field level achieved depends more on the width of the EO strip 43 than on whether the EO waveguide area has a "normal" structure or a "crab" structure. Comparing the "normal" structure and the "crab" structure, when the values for their EO-strip widths are chosen so that both structures have the same RF E-field strength in the central region of those EO strips, the RF loss of the "normal" structure is slightly lower, as shown in FIG. 19E, but the equivalent characteristic impedance also is slightly lower.

Figure 20A:
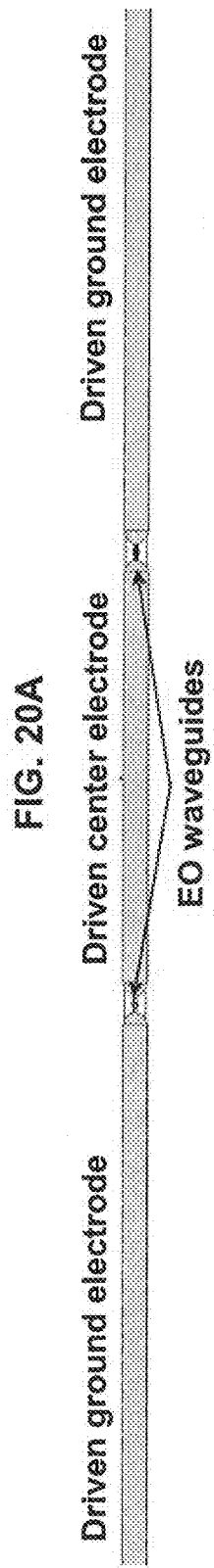
Figure 20B:
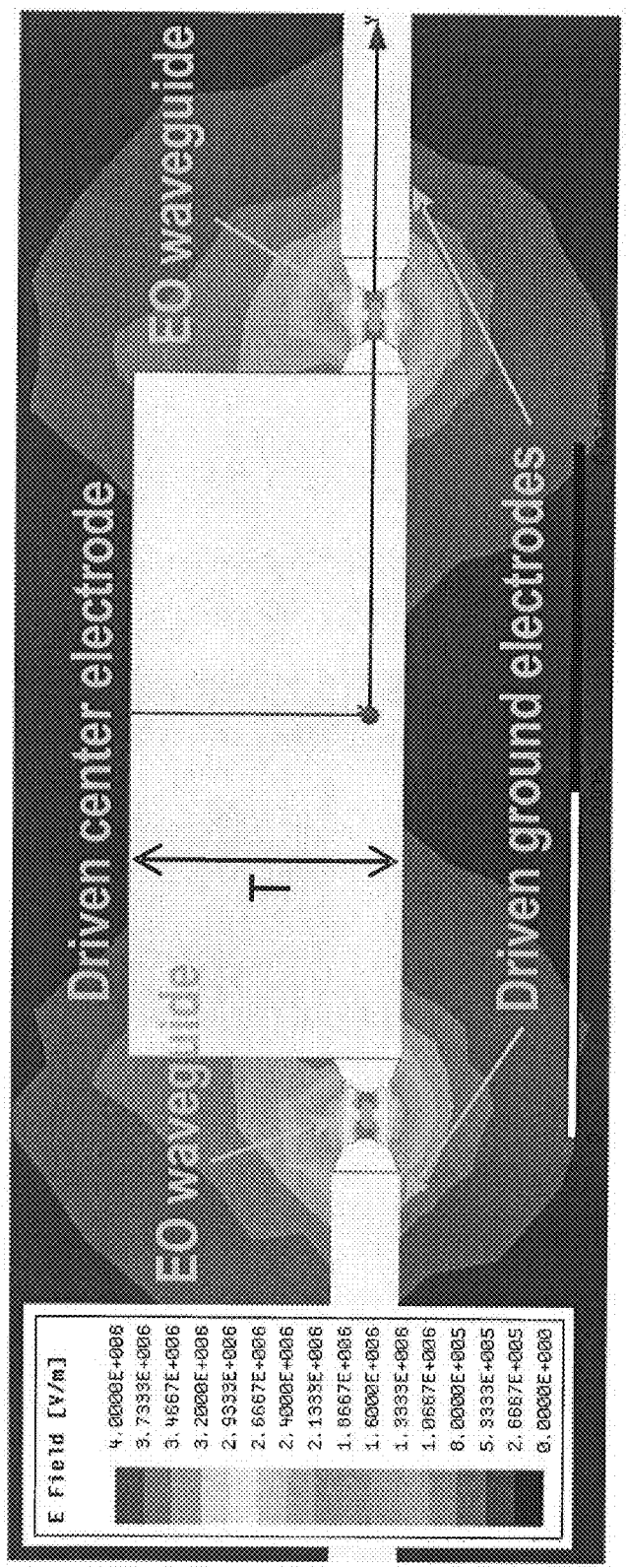

The modulator structures with two driven electrodes, as described herein, can be compared with a more conventional EO modulator structure that has three driven electrodes—a center signal electrode and a pair of "ground" electrodes at the sides. FIG. 20A shows an example cross-section of such a structure that has two EO waveguides and this set of three driven electrodes. Substantial electrical current would be carried in all three driven electrodes as the RF field propagates through the transmission line. The widths of the two ground electrodes can be made very large, just as the widths of the two driven electrodes of the other structures disclosed herein can be made very large, in order to reduce the RF loss of the transmission line electrode structure. However, the width of the center electrode also determines the lateral separation between the two EO waveguides. Thus, there may be other constraints on the allowable maximum width of the center electrode. Since for the structure of FIG. 20A the center electrode is driven, the width of the center electrode also has a strong effect on the RF loss. Simulations show that the RF loss can be fairly small when the width of the center electrode is greater than 40-50 µm, for a signal frequency of 40 GHz. FIGS. 20B and 20C show results obtained for two different heights, T, of the center electrode. A taller center electrode has lower RF loss. However, the E-field in the EO waveguides is lower because more of the RF field bypasses the EO waveguide.

A comparison of the results obtained for the structure with three driven electrodes with the results obtained for the HS electrode structures with two driven electrodes can be useful for pointing out the benefits of the new push-pull modulator. The RF E-field across the EO waveguides that is obtained with the structure of FIG. 20A is higher, by more than 20%, than the RF E-field across the EO waveguides of the HS electrode structure. However, the RF loss is much higher, by nearly 60%. Thus, the HS structure with two driven electrodes 44, 46 can have longer electrodes and longer sections of RF-modulated EO waveguides 40, 42. The longer interaction length between the RF and optical fields more than compensates for the somewhat lower modulating RF E-field strength. Another benefit of the structure with the HS electrode portions, as shown in FIG. 8A, is that its characteristic impedance is approximately 60-75 Ohms, depending on the width of the EO strips, which matches well with the characteristic RF impedance of many antennas. In contrast, the characteristic impedance of the structure of FIG. 20A is approximately 25 Ohms. Thus, the RF power needed to produce a given depth of optical modulation can be lower for the structure of FIGS. 8A and 12 with two driven electrodes.

A comparison of the results obtained for the "HS" and the "double U" structures, of FIGS. 8A and 12, respectively, with two driven electrodes can be useful for pointing out the differences between these two push-pull modulators. First, the double-U structure provides equal splitting of the RF signal. Thus, the RF E-fields in the two EO waveguides should have the same strength, regardless of the signal frequency. Both the double-U structure and the HS structure can potentially have a large RF bandwidth, limited primarily by the increase in RF loss with frequency. When the HS structure and the double-U structure are designed such that they have the same RF loss, the RF E-field in the EO waveguides is slightly higher by nearly 10% for the double-U structure of FIG. 12, as indicated by comparing the results shown in FIGS. 9A, 9B, and 9C with FIGS. 14A through 14G. However, the equivalent characteristic impedance of the double-U structure is less than one-half the impedance of the HS structure. Thus, the RF drive power needed for modulating the HS structure can be much lower. The HS structure has the additional versatility that its design can be modified to achieve a certain ratio between the RF E-field levels obtained in its two EO waveguides 40, 42, for example to compensate for unequal lengths of the two EO waveguides as in an asymmetric Mach-Zehnder interferometer.

FIG. 21 outlines a process that could be used to fabricate the disclosed modulator. In step (a), as illustrated in the FIG. 21A, a wafer is provided that contains a $LiNbO_3$ thin film 100 formed on a base substrate 102 with an oxide layer 101 between the $LiNbO_3$ layer 100 and the base substrate 102. Such a wafer can be purchased from suppliers such as Partow Technologies and NanoLN. In step (b), shown in FIG. 21B, silicon nitride ribs 53 are deposited above the $LiNbO_3$ film 100, the $LiNbO_3$ film is etched to define the EO strips 43, and the oxide film 101 above the base substrate 100 is etched to expose the regions where the electrode protrusions are to be formed, and then electrode protrusions 52, 54 are formed, by means such as electroplating of gold, silver or copper. In step (c) shown in FIG. 21C, the EO waveguides 43 are covered with additional oxide 104. Then posts 106 are formed on the electrode structure by means such as Au, Ag, or Cu electroplating. The regions between the posts 106 are filled with a dielectric filler 108, such as a polymer film. The arms of the electrodes 44, 46 are formed and then more dielectric filler 108 is deposited. In step (d), shown in FIG. 21D, the top surface is planarized, such as by chemical-mechanical polishing. Then the flattened top surface is bonded onto a carrier substrate 110, typically through a bonding layer 112. In step (e), shown in FIG. 21E the base substrate 102 is removed from the bonded assembly. In step (f), shown in FIG. 21F, additional ribs 53 may be formed on the "bottom" side of the lithium niobate EO strips 43, by first etching through the oxide material 104 to expose the lithium niobate surface 43 and then depositing the rib material 53. Then the rib 53 and EO strip 43 may be covered with additional oxide. Then additional electrode posts 114 may be formed on the electrode protrusions 52, 54 by a means such as electroplating. In step (g), shown in FIG. 21G, the spaces between the posts 114 are filled with additional dielectric filler 116 such as by coating with a thick polymer film. Then, the rest of the electrode 118 that is on the back-side of the EO strips 43 is formed, such as by electroplating. Then the spaces between the electrodes may be filled with more polymer filler 116. Finally, the carrier substrate 110 and the bonding layer 112 may be removed to obtain a thick film that includes the modulator and its electrode structure 44, 46 and 48 and EO strips 43. The optical waveguide end-sections 20, 22 may also be included in this thick film. This thick-film electro-optic modulator can then be attached to an RF antenna, though the arms of its driven electrodes 44, 46, as well as to optical fibers that carry the light to/from the modulator, through the ends of its optical waveguides 43.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A photonic modulator comprising:
   a first electro-optical waveguide, the first electro-optical waveguide having a first electro-optical waveguide side and a second electro-optical waveguide side opposite the first electro-optical waveguide side;
   a second electro-optical waveguide, the second electro-optical waveguide having a third electro-optical waveguide side and a fourth electro-optical waveguide side opposite the third electro-optical waveguide side;
   a first driven radio frequency electrode coupled to the first electro-optical waveguide side;
   a second driven radio frequency electrode coupled to the third electro-optical waveguide side; and
   a floating electrode coupled to the second electro-optical waveguide side and coupled to the fourth electro-optical waveguide side;
   wherein the second electro-optical waveguide side and the third electro-optical waveguide side directly face each other and are spaced apart from one another.

2. The photonic modulator of claim 1 further comprising:
   an optical input coupled to the first electro-optical waveguide and the second electro-optical waveguide; and
   an optical output coupled to the first electro-optical waveguide and the second electro-optical waveguide.

3. The photonic modulator of claim 1 wherein:
   a portion of the first driven radio frequency electrode, a portion of the floating electrode, and a portion of the first electro-optical waveguide form an H shaped cross-section; and
   a portion of the second driven radio frequency electrode, a portion of the floating electrode, and a portion of the second electro-optical waveguide form an S shaped cross-section.

4. The photonic modulator of claim 1 wherein:
   the first driven radio frequency electrode comprises:
      a first straight portion coupled to the first electro-optical waveguide side;
      a second straight portion; and
      a first curved portion between the first straight portion and the second straight portion;
   the second driven radio frequency electrode comprises:
      a third straight portion coupled to the third electro-optical waveguide side;
      a fourth straight portion; and
      a second curved portion between the third straight portion and the fourth straight portion;
   and
   the floating electrode comprises:
      a fifth straight portion coupled to the second electro-optical waveguide side;
      a sixth straight portion coupled to the fourth electro-optical waveguide side;
      a seventh straight portion;
      a third curved portion between the fifth straight portion and the seventh straight portion; and
      a fourth curved portion between the sixth straight portion and the seventh straight portion.

5. The photonic modulator of claim 1 wherein:
   the first driven radio frequency electrode extends above and below the first electro-optical waveguide;
   the second driven radio frequency electrode extends above the second electro-optical waveguide;
   a first portion of the floating electrode coupled to the second electro-optical waveguide extends below the second electro-optical waveguide; and
   a second portion of the floating electrode coupled to the first electro-optical waveguide extends above and below the first electro-optical waveguide.

6. The photonic modulator of claim 1 wherein:
   the first electro-optical waveguide comprises:
      a first strip of electro-optic material having a rectangular cross-section with the first electro-optical waveguide side on one shorter side of the first strip and the second electro-optical waveguide side on an opposite shorter side of the first strip; and
   the second electro-optical waveguide comprises:
      a second strip of electro-optic material having a rectangular cross-section with the third electro-optical waveguide side on one shorter side of the second strip and the fourth electro-optical waveguide side on an opposite shorter side of the second strip.

7. The photonic modulator of claim 6 wherein:
the first strip of electro-optic material comprises lithium niobate or strontium barium niobate; and
the second strip of electro-optic material comprises lithium niobate or strontium barium niobate.

8. The photonic modulator of claim 6 wherein:
the first electro-optical waveguide further comprises:
 a first non-electro-optic material abutting one longer side of the first strip, or a first non-electro-optic material abutting one longer side of the first strip and a second non-electro-optic material abutting an opposite longer side of the first strip; and
the second electro-optical waveguide further comprises:
 a third non-electro-optic material abutting one longer side of the second strip, or a third non-electro-optic material abutting one longer side of the second strip and a fourth non-electro-optic material abutting an opposite longer side of the second strip.

9. The photonic modulator of claim 8 wherein:
the first non-electro-optic material comprises silicon nitride;
the second non-electro-optic material comprises silicon nitride;
the third non-electro-optic material comprises silicon nitride; and
the fourth non-electro-optic material comprises silicon nitride.

10. The photonic modulator of claim 1 wherein:
the first driven radio frequency electrode comprises a first protrusion coupled to the first electro-optical waveguide;
the floating electrode comprises a second protrusion coupled to the first electro-optical waveguide and a third protrusion coupled to the second electro-optical waveguide; and
the second driven radio frequency electrode comprises a fourth protrusion coupled to the second electro-optical waveguide.

11. The photonic modulator of claim 10 further comprising:
a first insulating spacer between the first protrusion and the first electro-optical waveguide;
a second insulating spacer between the second protrusion and the first electro-optical waveguide;
a third insulating spacer between the third protrusion and the second electro-optical waveguide; and
a fourth insulating spacer between the fourth protrusion and the second electro-optical waveguide.

12. A photonic modulator comprising:
a first electro-optical waveguide, the first electro-optical waveguide having a first electro-optical waveguide side and a second electro-optical waveguide side opposite the first electro-optical waveguide side;
a second electro-optical waveguide, the second electro-optical waveguide having a third electro-optical waveguide side and a fourth electro-optical waveguide side opposite the third electro-optical waveguide side;
a first driven radio frequency electrode coupled to the first electro-optical waveguide side and to the fourth electro-optical waveguide side; and
a second driven radio frequency electrode coupled to the second electro-optical waveguide side and coupled to the third electro-optical waveguide side;
wherein the second electro-optical waveguide side and the third electro-optical waveguide side face each other and are spaced apart from one another.

13. The photonic modulator of claim 12 further comprising:
an optical input coupled to the first electro-optical waveguide and the second electro-optical waveguide; and
an optical output coupled to the first electro-optical waveguide and the second electro-optical waveguide.

14. The photonic modulator of claim 12 wherein:
the first driven radio frequency electrode has a U shaped cross-section; and
the second driven radio frequency electrode has an inverted U shaped cross-section.

15. The photonic modulator of claim 12 wherein:
the first driven radio frequency electrode comprises:
 a first straight portion coupled to the first electro-optical waveguide side;
 a second straight portion coupled to the fourth electro-optical waveguide side;
 a third straight portion;
 a first curved portion between the first straight portion and the third straight portion; and
 a second curved portion between the second straight portion and the third straight portion; and
the second driven radio frequency electrode comprises:
 a fourth straight portion coupled to the second electro-optical waveguide side;
 a fifth straight portion coupled to the third electro-optical waveguide side;
 a sixth straight portion;
 a third curved portion between the fourth straight portion and the sixth straight portion; and
 a fourth curved portion between the fifth straight portion and the sixth straight portion.

16. The photonic modulator of claim 12 wherein:
the first electro-optical waveguide comprises:
 a first strip of electro-optic material having a rectangular cross-section with the first electro-optical waveguide side on one shorter side of the first strip and the second electro-optical waveguide side on an opposite shorter side of the first strip; and
the second electro-optical waveguide comprises:
 a second strip of electro-optic material having a rectangular cross-section with the third electro-optical waveguide side on one shorter side of the second strip and the fourth electro-optical waveguide side on an opposite shorter side of the second strip.

17. The photonic modulator of claim 16 wherein:
the first strip of electro-optic material comprises lithium niobate or strontium barium niobate; and
the second strip of electro-optic material comprises lithium niobate or strontium barium niobate.

18. The photonic modulator of claim 16 wherein:
the first electro-optical waveguide further comprises:
 a first non-electro-optic material abutting one longer side of the first strip, or a first non-electro-optic material abutting one longer side of the first strip and a second non-electro-optic material abutting an opposite longer side of the first strip; and
the second electro-optical waveguide further comprises:
a third non-electro-optic material abutting one longer side of the second strip, or a third non-electro-optic material abutting one longer side of the second strip and a fourth non-electro-optic material abutting an opposite longer side of the second strip.

19. The photonic modulator of claim 18 wherein:
the first non-electro-optic material comprises silicon nitride;
the second non-electro-optic material comprises silicon nitride;
the third non-electro-optic material comprises silicon nitride; and
the fourth non-electro-optic material comprises silicon nitride.

20. The photonic modulator of claim 12 wherein:
the first driven radio frequency electrode comprises a first protrusion coupled to the first electro-optical waveguide and a second protrusion coupled to the second electro-optical waveguide; and
the second driven radio frequency electrode comprises a third protrusion coupled to the first electro-optical waveguide and a fourth protrusion coupled to the second electro-optical waveguide.

21. The photonic modulator of claim 20 further comprising:
a first insulating spacer between the first protrusion and the first electro-optical waveguide;
a second insulating spacer between the second protrusion and the first electro-optical waveguide;
a third insulating spacer between the third protrusion and the second electro-optical waveguide; and
a fourth insulating spacer between the fourth protrusion and the second electro-optical waveguide.

22. A method of providing a photonic modulator comprising:
providing a base substrate having an oxide layer on the base substrate and an electro-optic material on the oxide layer;
forming a first silicon nitride rib on the electro-optic material;
etching the electro-optic material to form an electro-optic strip;
etching the oxide layer at opposite ends of the electro-optic strip;
forming electrode protrusions at the opposite ends of the electro-optic strip;
covering the electro-optic strip with oxide;
forming first electrode posts on the electrode protrusions;
filling regions between the first electrode posts with a dielectric filler;
forming first radio frequency electrodes coupled to the first electrode posts;
depositing dielectric filler;
planarizing a top surface to be planar with the first radio frequency electrodes;
bonding the top surface to a carrier substrate;
removing the base substrate;
forming second electrode posts on the electrode protrusions;
filling spaces between the second electrode posts with dielectric filler;
forming second radio frequency electrodes coupled to the second electrode posts; and
filling spaces between the second radio frequency electrodes with polymer.

23. The method of claim 22 wherein:
the electro-optic strip has a rectangular cross-section; and
the electrode protrusions are on opposite short sides of the rectangular cross-section.

24. The method of claim 22 wherein:
the electro-optic strip comprises lithium niobate or strontium barium niobate.

25. The method of claim 22 further comprising:
forming an insulating spacer between the electro-optic strip and the electrode protrusions at the opposite ends of the electro-optic strip.

26. The method of claim 22 further comprising:
forming a second silicon nitride rib on a side of the electro-optic strip opposite the first silicon nitride rib.

27. The method of claim 26 further comprising:
covering the second silicon nitride rib with oxide.

28. The method of claim 22 further comprising:
removing the carrier substrate.

29. A method for providing a photonic modulator comprising:
providing a first electro-optical waveguide, the first electro-optical waveguide having a first electro-optical waveguide side and a second electro-optical waveguide side opposite the first electro-optical waveguide side;
providing a second electro-optical waveguide, the second electro-optical waveguide having a third electro-optical waveguide side and a fourth electro-optical waveguide side opposite the third electro-optical waveguide side;
providing a first driven radio frequency electrode coupled to the first electro-optical waveguide side;
providing a second driven radio frequency electrode coupled to the third electro-optical waveguide side; and
providing a floating electrode coupled to the second electro-optical waveguide side and coupled to the fourth electro-optical waveguide side;
wherein the second electro-optical waveguide side and the third electro-optical waveguide side directly face each other and are spaced apart from one another.

30. The method of claim 29 wherein:
a portion of the first driven radio frequency electrode, a portion of the floating electrode, and a portion of the first electro-optical waveguide form an H shaped cross-section; and
a portion of the second driven radio frequency electrode, a portion of the floating electrode, and a portion of the second electro-optical waveguide form an S shaped cross-section.

31. A method of providing a photonic modulator comprising:
providing a first electro-optical waveguide, the first electro-optical waveguide having a first electro-optical waveguide side and a second electro-optical waveguide side opposite the first electro-optical waveguide side;
providing a second electro-optical waveguide, the second electro-optical waveguide having a third electro-optical waveguide side and a fourth electro-optical waveguide side opposite the third electro-optical waveguide side;
providing a first driven radio frequency electrode coupled to the first electro-optical waveguide side and to the fourth electro-optical waveguide side; and
providing a second driven radio frequency electrode coupled to the second electro-optical waveguide side and coupled to the third electro-optical waveguide side;
wherein the second electro-optical waveguide side and the third electro-optical waveguide side face each other and are spaced apart from one another; and
wherein the first driven radio frequency electrode has a U shaped cross-section and the second driven radio frequency electrode has an inverted U shaped cross-section.

* * * * *